United States Patent
Miyata

(10) Patent No.: US 8,472,075 B2
(45) Date of Patent: Jun. 25, 2013

(54) PRINT JOB MANAGEMENT DEVICE, PRINT JOB MANAGEMENT METHOD, AND COMPUTER-READABLE STORAGE MEDIUM

(75) Inventor: Junichi Miyata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 639 days.

(21) Appl. No.: 12/437,724

(22) Filed: May 8, 2009

(65) Prior Publication Data

US 2009/0279139 A1 Nov. 12, 2009

(30) Foreign Application Priority Data

May 8, 2008 (JP) ................................ 2008-122306

(51) Int. Cl.
*G06F 15/00* (2006.01)
(52) U.S. Cl.
USPC ........... 358/1.9; 358/1.15; 358/1.13; 358/296
(58) Field of Classification Search
None
See application file for complete search history.

(56) References Cited

U.S. PATENT DOCUMENTS

| 2005/0042007 | A1* | 2/2005 | Fujii et al. ...................... 399/407 |
| 2006/0232818 | A1* | 10/2006 | Hino et al. .................... 358/1.15 |
| 2006/0238803 | A1* | 10/2006 | Kuroshima .................. 358/1.15 |
| 2007/0242962 | A1* | 10/2007 | Yamamoto ...................... 399/15 |
| 2007/0291286 | A1* | 12/2007 | Utsunomiya et al. .......... 358/1.8 |
| 2008/0239381 | A1* | 10/2008 | Oshima ........................ 358/1.15 |
| 2009/0279137 | A1* | 11/2009 | Mori ............................ 358/1.15 |

FOREIGN PATENT DOCUMENTS

JP 2006-309319 A 11/2006

* cited by examiner

*Primary Examiner* — Twyler Haskins
*Assistant Examiner* — Helen Q Zong
(74) *Attorney, Agent, or Firm* — Canon USA, Inc., IP Division

(57) ABSTRACT

When it is set by a user to use a nearline finisher with priority, if a print job that uses an inline finisher is to be processed, the print job using the inline finisher is divided into a print job to be executed with the inline finisher and a print job to be executed with the nearline finisher. In contrast, when it is set by a user to use the inline finisher with priority, if a print job that uses the nearline finisher is to be processed, a portion to be executed with the inline finisher and a portion to be executed with the nearline finisher are aggregated, thereby converting the print job to a print job for the inline finisher.

12 Claims, 18 Drawing Sheets

FIG. 8A

| SETTING ITEM | SETTING VALUE | |
|---|---|---|
| PRIORITY CONVERSION SETTING | | ~1403 |
| COVER OUTPUT DESTINATION | | ~1404 |
| CONTENTS OUTPUT DESTINATION | | ~1405 |
| JOB TICKET OUTPUT | | ~1406 |
| FINAL PRODUCT OUTPUT DESTINATION | | ~1407 |

| SETTING ITEM | SETTING VALUE | |
|---|---|---|
| PRIORITY CONVERSION SETTING | PRIORITY ON NEARLINE FINISHER | ~1408 |
| COVER OUTPUT DESTINATION | StackerA | ~1409 |
| CONTENTS OUTPUT DESTINATION | StackerB | ~1410 |
| JOB TICKET OUTPUT | COVER/CONTENTS | ~1411 |
| FINAL PRODUCT OUTPUT DESTINATION | – | |

| SETTING ITEM | SETTING VALUE | |
|---|---|---|
| PRIORITY CONVERSION SETTING | PRIORITY ON INLINE FINISHER | ~1412 |
| COVER OUTPUT DESTINATION | – | |
| CONTENTS OUTPUT DESTINATION | – | |
| JOB TICKET OUTPUT | – | |
| FINAL PRODUCT OUTPUT DESTINATION | StackerC | ~1413 |

1401　1402

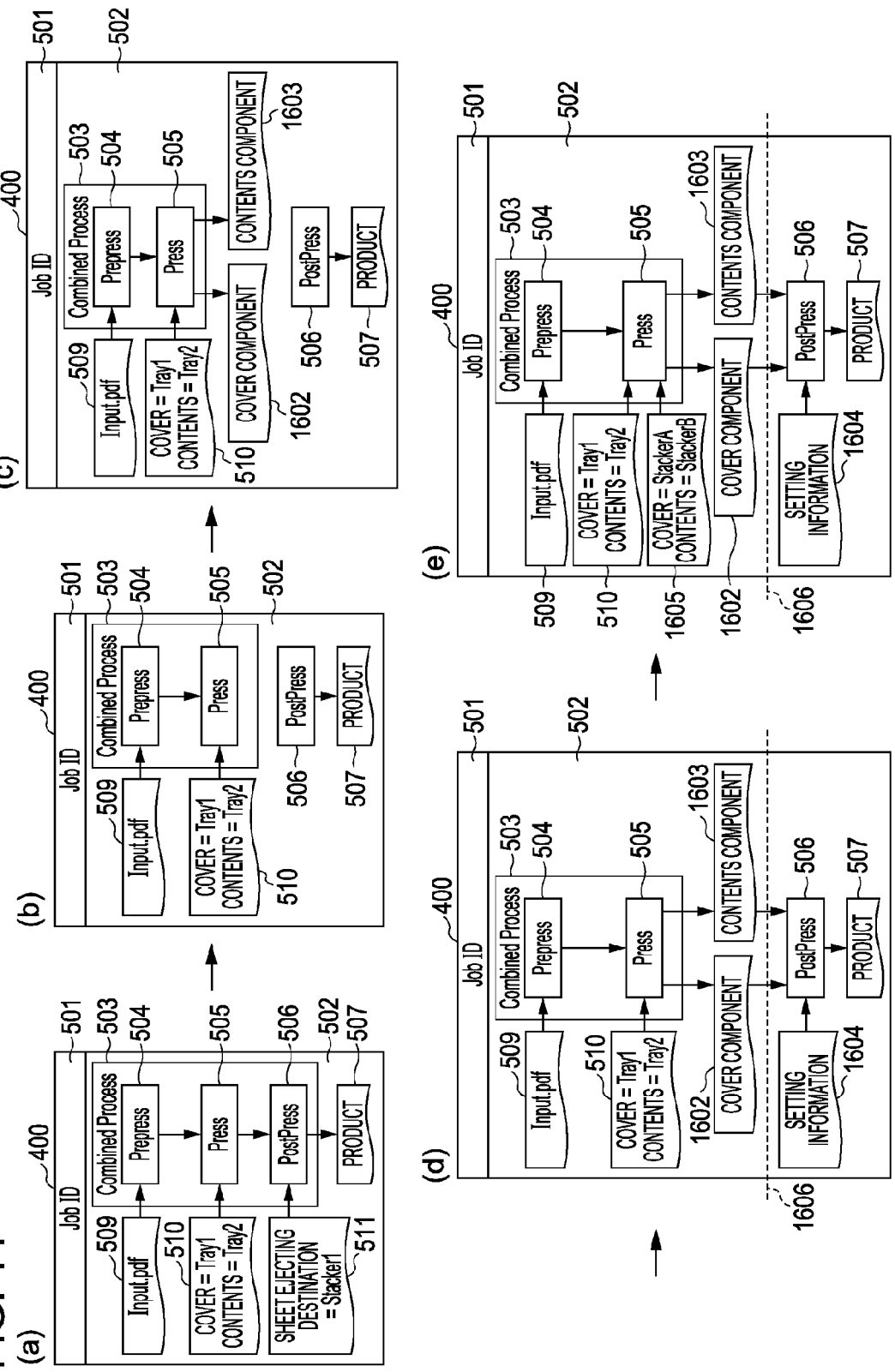

PRINT JOB MANAGEMENT DEVICE, PRINT JOB MANAGEMENT METHOD, AND COMPUTER-READABLE STORAGE MEDIUM

BACKGROUND OF THE INVENTION

1. Field of the Invention

The present invention relates to a print job management device, a print job management method, and a computer-readable storage medium, and more particularly, to techniques used for performing post-processing after printing.

2. Description of the Related Art

In recent years, as the processing speed of electrophotographic printing devices and inkjet printing devices has increased and the image quality thereof has improved, a printed matter generating method called "print on demand" has become prominent in opposition to the conventional offset printing industry. Print on demand (hereinafter abbreviated as "POD") is intended to handle jobs with relatively smaller lot sizes than those handled with a conventional offset printing device in a short delivery time, without using a huge device or system.

The POD market is a market that realizes digital printing using electronic data by making maximum use of a digital image forming device, such as a digital copying device or a digital multifunctional device, and that has final products obtained by digital printing as commercial products. In the POD market as above, compared with the conventional printing industry, digitization has blended well with the system, and computer-based management and control have become widely spread.

The following system is conceived as a POD system for blending digitization and existing printing devices.

That is, a POD system including an inline finisher and a nearline finisher has been conceived. The inline finisher is a finishing device that is included in (physically connected to (e.g., contained in)) a digital multifunctional device and that automatically performs post-processing of an output matter from the digital multifunctional device, without involving the hands of a user. In contrast, the nearline finisher is a finishing device that is not included in (not physically connected to) a digital multifunctional device but that can communicate with the digital multifunctional device. The nearline finisher performs post-processing of an output matter from the digital multifunctional device when the output matter is manually set by the user.

In the POD system as above, when post-processing, such as case binding, an instruction therefor is given using a print job, cannot be performed with the inline finisher because of its lack of function or capability, the user generally places a sheet document on the nearline finisher.

One conventional technique of a system using a nearline finisher is a technique that physically and preliminarily prints, on an output matter from a digital multifunctional device, a job ticket that is described so as to enable a person working with the system to understand an operation instruction for the nearline finisher.

A job identifier (ID) that uniquely identifies a job is rendered as a barcode on a physical sheet, and the physical sheet on which the barcode is rendered is output. The barcode rendered on the physical sheet is read with a barcode reader included in the nearline finisher, and the job ID based on the barcode is compared with a job ID sent in advance to the nearline finisher.

Furthermore, a technique for using a combination of a digital multifunctional device with an inline finisher, and a nearline finisher is described in, for example, Japanese Patent Laid-Open No. 2006-309319. With this technique, the work load of inline finishing in the digital multifunctional device is dispersed among or performed in place thereof using one or multiple nearline finishers connected to a network, whereby the overall operation efficiency is improved.

However, the foregoing conventional techniques have the following problems when it is intended to generate, as a final product, a printed matter by performing post-processing such as case binding.

That is, the inline finisher is configured to produce, as an output matter, an exclusive product that has been case bound. Therefore, a job generated with the intention to be subjected to post-processing with a post-processor (inline finisher) included in the digital multifunctional device includes data on the cover and the contents. Therefore, with the conventional techniques, this job cannot be changed to a job that generates two products, the cover and the contents, and performs post-processing of the two products using the nearline finisher. That is, a job generated with the intention to be subjected to processing with the inline finisher cannot be changed to a job intended to be subjected to processing using the nearline finisher.

For example, when a case binding process is to be performed, the final product will be a case-bound product. Thus, it is instructed that a product generated from a job generated with the intention to be subjected to processing with the inline finisher included in the digital multifunctional device is an exclusive final product, and there is only one sheet ejecting destination. In contrast, in order to generate a case-bound product using the nearline finisher, a person working with the system must separately set the cover and the contents on the nearline finisher, and the nearline finisher performs a case binding process. Therefore, an output matter from the digital multifunctional device must correctly and separately include the cover and contents. However, with the conventional techniques, as described above, a job generated with the intention to be subjected to processing with the inline finisher cannot be changed to a job intended to be subjected to processing using the nearline finisher. Therefore, when a job that uses the inline finisher is generated, it is difficult to execute this job using the nearline finisher.

In contrast, a "product from the digital multifunctional device" in a job intended to generate the final product using the nearline finisher includes two products of the cover and the contents. Therefore, the conventional techniques are incapable of converting this job to a job for the inline finisher that requires an exclusive final product. Therefore, when a job that uses the nearline finisher is generated, it is difficult to execute this job using the inline finisher.

SUMMARY OF THE INVENTION

The present invention provides techniques for making it possible to adaptively use a post-processing device (inline finisher) included in a printing device and a post-processing device (nearline finisher) not included in the printing device.

The present invention provides a print job management device capable of communicating with a printing device and a first post-processing device, the first post-processing device not being connected to the printing device via a sheet conveying path, and the printing device including a second post-processing device that is connected to the printing device via a sheet conveying path. The print job management device includes an obtaining unit configured to obtain a first print job giving an instruction to perform a printing process and a post-printing process using the printing device and the second post-processing device; and an editing unit configured to edit the first print job obtained by the obtaining unit to be a second print job for performing the printing process using the printing device and the post-printing process using the first post-processing device.

Further features of the present invention will become apparent from the following description of exemplary embodiments with reference to the attached drawings.

BRIEF DESCRIPTION OF THE DRAWINGS

FIGS. 8A to 8C are diagrams illustrating examples of a table storing setting values according to the embodiment of the present invention.

FIG. 14 is a diagram conceptually illustrating an example of the procedure of a previous stage process of a process of dividing a print job (job ticket) process according to the embodiment of the present invention.

DESCRIPTION OF THE EMBODIMENTS

An embodiment of the present invention will now herein be described with reference to the drawings.

Figure 1:
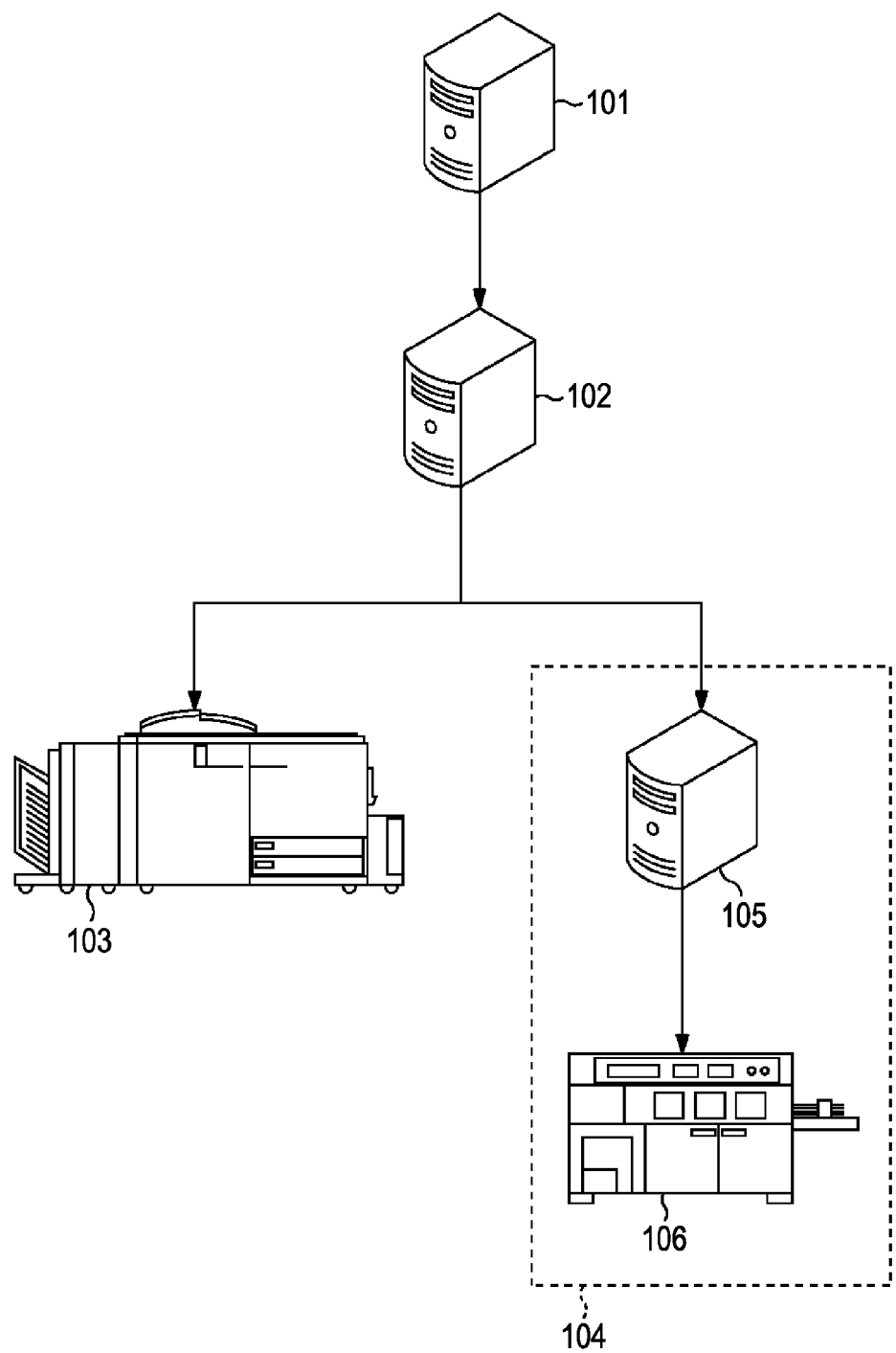
FIG. 1 is a diagram illustrating an example of the configuration of a printing system according to an embodiment of the present invention.

FIG. 1 is a diagram illustrating an example of the configuration of a printing system.

Referring to FIG. 1, the printing system includes a job generating PC 101, a workflow management server 102, a digital multifunctional device (hereinafter abbreviated as an MFP) 103, and a nearline finisher system 104.

The job generating PC 101 is a computer for generating a print job desired by a user. The workflow management server 102 divides a print job received from the job generating PC 101 into operation processes for completing the print job and sends print jobs of the operation processes to the MFP 103 and the nearline finisher system 104. The print jobs include print data used for printing (e.g., content data such as data in the portable document format (PDF)) and setting information (e.g., JDF information) used for printing and post-processing. Alternatively, the print data may be obtained by the MFP 103 from a reference source described in the JDF information.

Here, the MFP 103 is a printing device, such as a monochrome MFP or a color MFP. The MFP 103 prints out a document in accordance with an operation instruction in a print job received from the workflow management server 102. Also, the MFP 103 can perform post-processing, such as case binding, by itself. However, when an inline finisher of the MFP 103 (e.g., an inline finisher contained in the MFP 103) has insufficient function or capability, post-processing (e.g., case binding) may be performed using a nearline finisher 106.

The nearline finisher system 104 includes a nearline finisher control server 105 and the nearline finisher 106, such as a case binding machine. The nearline finisher control server 105 is a computer that controls and manages a post-processing process. On the basis of an instruction in a print job received from the workflow management server 102, the nearline finisher control server 105 gives an instruction to the nearline finisher 106 to perform a post-processing (finishing) process as requested by the print job. In general, the nearline finisher control server 105 exchanges information with the workflow management server 102, and exchanges information with the nearline finisher 106 on the basis of internal commands and the status of the nearline finisher 106. The workflow management server 102 can obtain information on the nearline finisher 106 via the nearline finisher control server 105.

The nearline finisher 106 performs control to perform, as various sheet processing processes on an output document, post-processing of a sheet document printed with an image forming device, such as the MFP 103, and to process the printed sheet document to be bound in a desired manner. The post-processing include a cutting step, a saddle stitching step, a case binding process, a sheet folding step, a punching step, an enclosing step, a sheet reordering step, and the like.

The workflow management server 102 manages the overall workflow of the printing system by giving operation instructions to the MFP 103 and the nearline finisher system 104. Specifically, the workflow management server 102 receives a print job from the job generating PC 101 and, on the basis of an instruction in the print job, organizes operations in individual steps as a workflow.

The job generating PC 101, the workflow management server 102, the MFP 103, and the nearline finisher system 104 exchange information using, for example, JDF. JDF is a description format of, for example, a job ticket that describes an operation instruction in a print job. The job generating PC 101, the workflow management server 102, the MFP 103, and the nearline finisher system 104 transfer print jobs and issue control commands by employing JDF. Accordingly, the workflow management server 102 realizes automation of the total workflow using the MFP 103 and the nearline finisher system 104.

Figure 18:
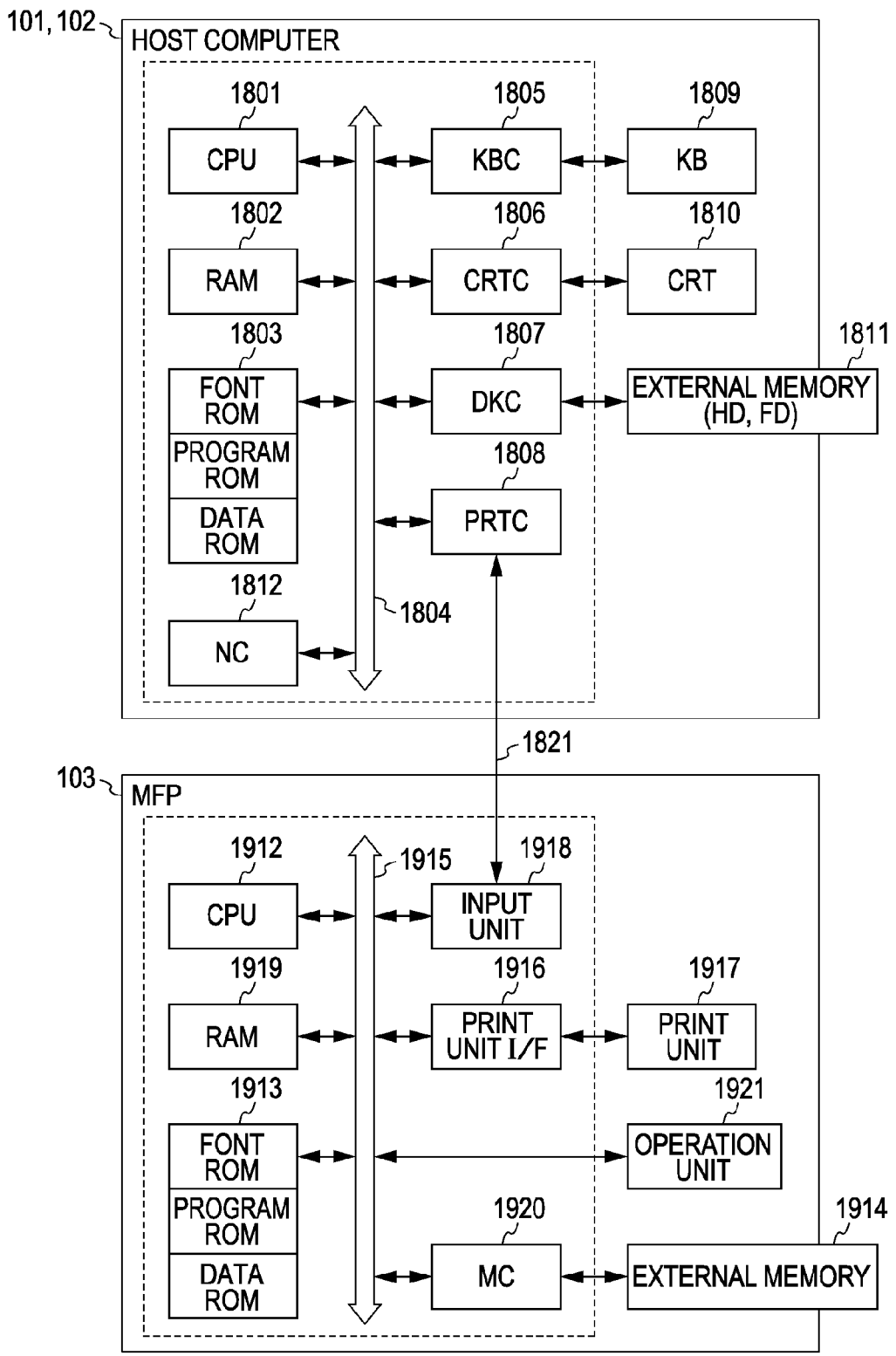
FIG. 18 is a diagram illustrating an example of the hardware structure of a job generating personal computer (PC), a workflow management server, and the digital multifunctional device.

FIG. 18 is a diagram illustrating an example of the hardware structure of the devices according to the present embodiment. In FIG. 18, the job generating PC 101 and the workflow management server 102 are collectively referred to as a host computer.

The job generating PC 101 and the workflow management server 102 include a central processing unit (CPU) 1801 that performs document processing on a mixture of graphics, images, characters, and tables (including a spreadsheet) on the basis of, for example, a document processing program stored on a read-only memory (ROM) 1803 or an external memory 1811. In the job generating PC 101 and the workflow management server 102, the CPU 1801 controls devices connected to a system bus 1804 as a whole. Also, a program ROM in the ROM 1803 or the external memory 1811 stores, for example, an operating system (OS) program that is a control program for the CPU 1801. A font ROM in the ROM 1803 or the external memory 1811 stores, for example, font data used at the time of performing the foregoing document processing. A data ROM included in the ROM 1803 or the external memory 1811 stores various items of data used at the time of performing the foregoing document processing and the like. A random-access memory (RAM) 1802 functions as, for example, a main memory or a work area for the CPU 1801.

A keyboard controller (KBC) 1805 controls key entries using a keyboard 1809 or a pointing device (not illustrated in FIG. 18). A cathode-ray tube (CRT) controller (CRTC) 1806 controls displaying of a CRT display (CRT) 1810. A disk controller (DKC) 1807 controls access to the external memory 1811 storing files, such as a hard disk (HD) or a flexible disk (FD). The stored files include a boot program, various applications, font data, user files, editing files, and a printer control command generating program (hereinafter called a "printer driver"). A printer controller (PRTC) 1808 is connected to the MFP 103 via a bidirectional interface (interface) 1821 and performs control processing for communication with the MFP 103. An NC 1812 is connected to a network and performs control processing for communication with other devices connected to the network.

The CPU 1801 performs, for example, rasterizing of outline fonts on a display information RAM set on the RAM 1802, thus implementing "What You See Is What You Get" (WYSIWYG) on the CRT 1810. Also, the CPU 1801 opens various windows registered on the basis of commands given using a mouse cursor (not illustrated in FIG. 18) or the like on the CRT 1810 and performs various types of data processing. When the user wishes to perform printing, the user opens a window for setting print settings, whereby the user can set settings of the MFP 103 or a printing/processing method for the printer driver including selection of a print mode.

The MFP 103 is controlled by a CPU 1912. The CPU 1912 outputs an image signal serving as output information to a print unit (printer engine) 1917 connected via a print unit interface 1916 to a system bus 1915, on the basis of a control program stored on a ROM 1913 or an external memory 1914. A program ROM included in the ROM 1913 stores, for example, a control program for the CPU 1912. A font ROM included in the ROM 1913 stores, for example, font data used at the time of generating the foregoing output information. A data ROM included in the ROM 1913 stores, for example, information used with the job generating PC 101 and the workflow management server 102 when the MFP 103 has no external memory 1914, such as a hard disk.

The CPU 1912 can communicate with the job generating PC 101 and the workflow management server 102 via an input unit 1918. The CPU 1912 can send, for example, a notification of information in the MFP 103 to the job generating PC 101 and the workflow management server 102. A RAM 1919 is a RAM that functions as, for example, a main memory or a work area for the CPU 1912. The memory capacity can be expanded by connecting an optional RAM to an expansion port (not illustrated in FIG. 18). The RAM 1919 is used as, for example, an output information expanding region, a surrounding data storage region, and a nonvolatile random-access memory (NVRAM). Access to the external memory 1914, such as a hard disk (HD) or an integrated circuit (IC) card, is controlled by a memory controller (MC) 1920. The external memory 1914 is optically connected and stores, for example, font data, an emulation program, and font data. Switches for entering operations and a light-emitting diode (LED) display device are provided on an operation unit (operation panel) 1921.

There may be provided one or multiple external memories 1914. The multiple external memories 1914 may include, besides internal fonts, an optional card and programs that analyze printer control languages of different language systems. Furthermore, an NVRAM (not illustrated in FIG. 18) may be provided, and printer mode setting information entered from the operation panel 1921 may be stored.

The nearline finisher control server 105 has substantially the same hardware structure as that of the workflow management server 102. The nearline finisher 106 has substantially the same hardware structure as that of the MFP 103. However, the nearline finisher 106 includes no hardware structure relating to printing.

Figure 2:
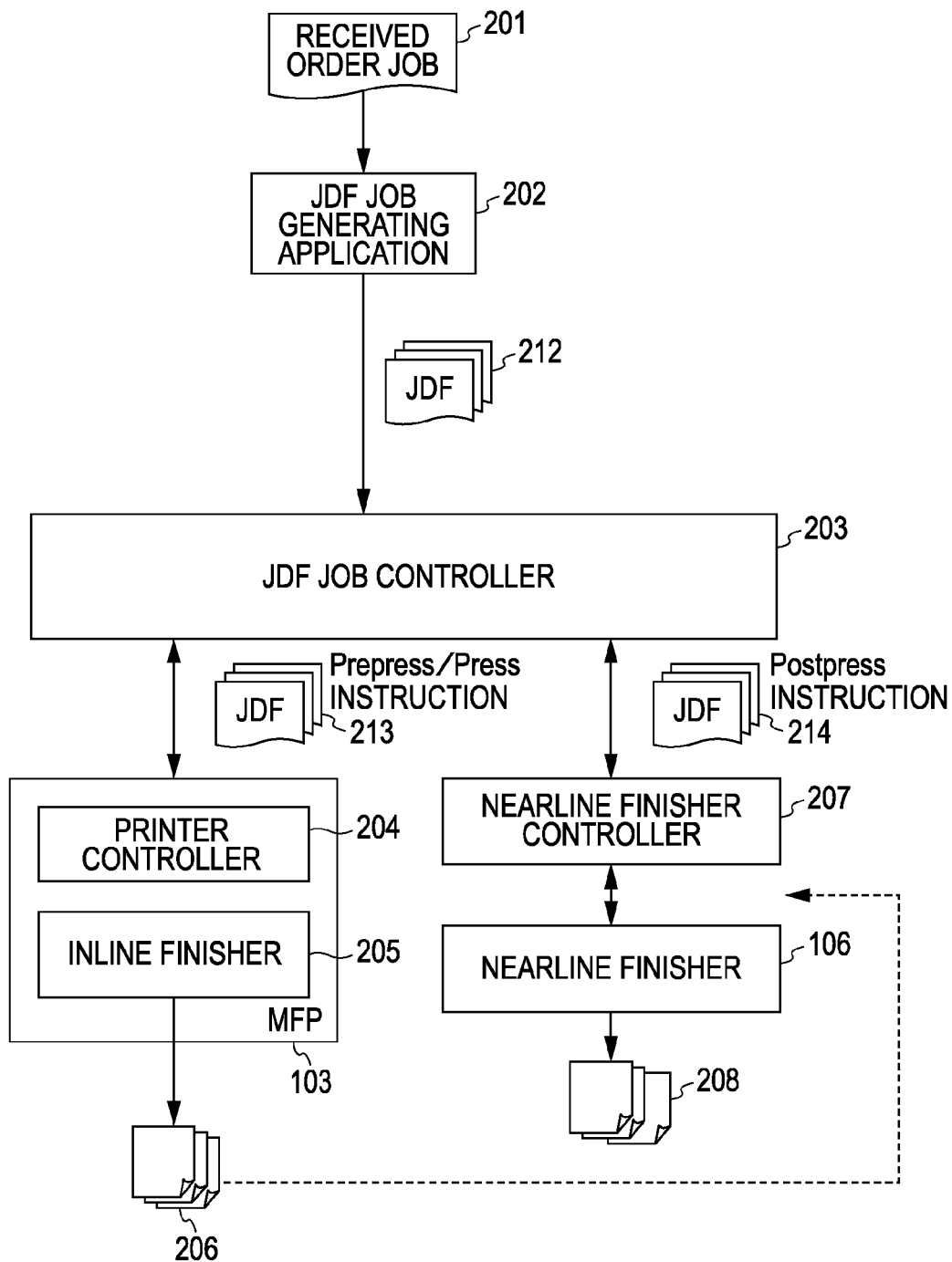
FIG. 2 is a diagram illustrating an example of the workflow of the printing system according to the embodiment of the present invention.

FIG. 2 is a diagram illustrating an example of the workflow of the printing system.

A JDF job generating application 202 running on the job generating PC 101 generates, from a received order job 201 received from a customer, a JDF job 212, which is a print job in which operation instructions in the workflow are described, on the basis of an instruction of a person working with the printing system (hereinafter may be called a "user").

The JDF job 212 is sent to a JDF job controller 203 running on the workflow management server 102. Upon receipt of the JDF job 212, the JDF job controller 203 divides the JDF job 212 into portions in accordance with operation instructions (prepress, press, postpress, etc.) described in the JDF job 212. The JDF job controller 203 generates operation instructions for the MFP 103 and the nearline finisher system 104 on the basis of the details of the portions obtained by dividing the JDF job 212, and sends the operation instructions as JDF jobs 213 and 214 to the MFP 103 and the nearline finisher system 104, respectively.

When the JDF job 213 is sent to the MFP 103, a printer controller 204 analyzes the JDF job 213 and performs a printing process. The JDF job 213 includes, for example, an operation instruction for a pressing process to be processed by the MFP 103. In this operation instruction, attributes such as sheet feeding stage information, an output sheet size, twoside/one-side printing, and N-up are specified as setting parameters for the pressing instruction. In accordance with the details of the JDF job 213, a printing process is performed, thereby obtaining an output matter 206.

When the JDF job 213 includes instructions relating to post-processing, such as case binding, saddle stitching, and cutting, the MFP 103 may perform post-processing after printing by using the an inline finisher 205 in accordance with the details of the JDF job 213.

When the JDF job 214 is sent to the nearline finisher system 104, a nearline finisher controller 207 analyzes the JDF job 214 and performs post-processing. The JDF job 214 includes, for example, an operation instruction for a postpressing process to be processed by the nearline finisher 106. In the JDF job 214, attributes of, for example, case binding, saddle stitching, and cutting are specified. In accordance with the details of the JDF job 214, the nearline finisher 106 performs post-processing after printing and obtains an output matter 208.

The nearline finisher system 104 requires a sheet document in order to perform post-processing. Normally, the output matter 206 from the MFP 103 is manually carried by the user and is set on the nearline finisher 106.

As above, although the operation instructions themselves are given via a network, the actual sheet document is not electronically sent from the MFP 103 to the nearline finisher 106. Therefore, when post-processing is to be performed using the nearline finisher 106, the user manually carries a sheet document to the nearline finisher 106, and post-processing of the sheet document is performed using the nearline finisher 106.

Here, in the printing system illustrated in FIG. 1, when the inline finisher 205 (post-processing device) included in the MFP 103 is to be used in order to perform case binding printing, a pressing process and a postpressing process are described in the JDF job 213, and the JDF job 213 is sent to the MFP 103. Accordingly, a case-bound printed matter that is an exclusive product (output matter) from the MFP 103 is obtained. In contrast, when bookbinding is to be performed with a case binding machine, which is a nearline finisher (post-processing device) not included in the MFP 103, a document for the cover and a document for the contents are separately output using a digital printing device. The user carries the document for the cover and the document for the contents to the case binding machine and sets the document for the cover and the document for the contents on a sheet feeding stage of the case binding machine, and the case binding machine performs a case binding operation. As above, it is generally necessary in the case binding machine, such as a nearline finisher, to separately perform processing of a document for the cover and a document for the contents.

Figure 3:
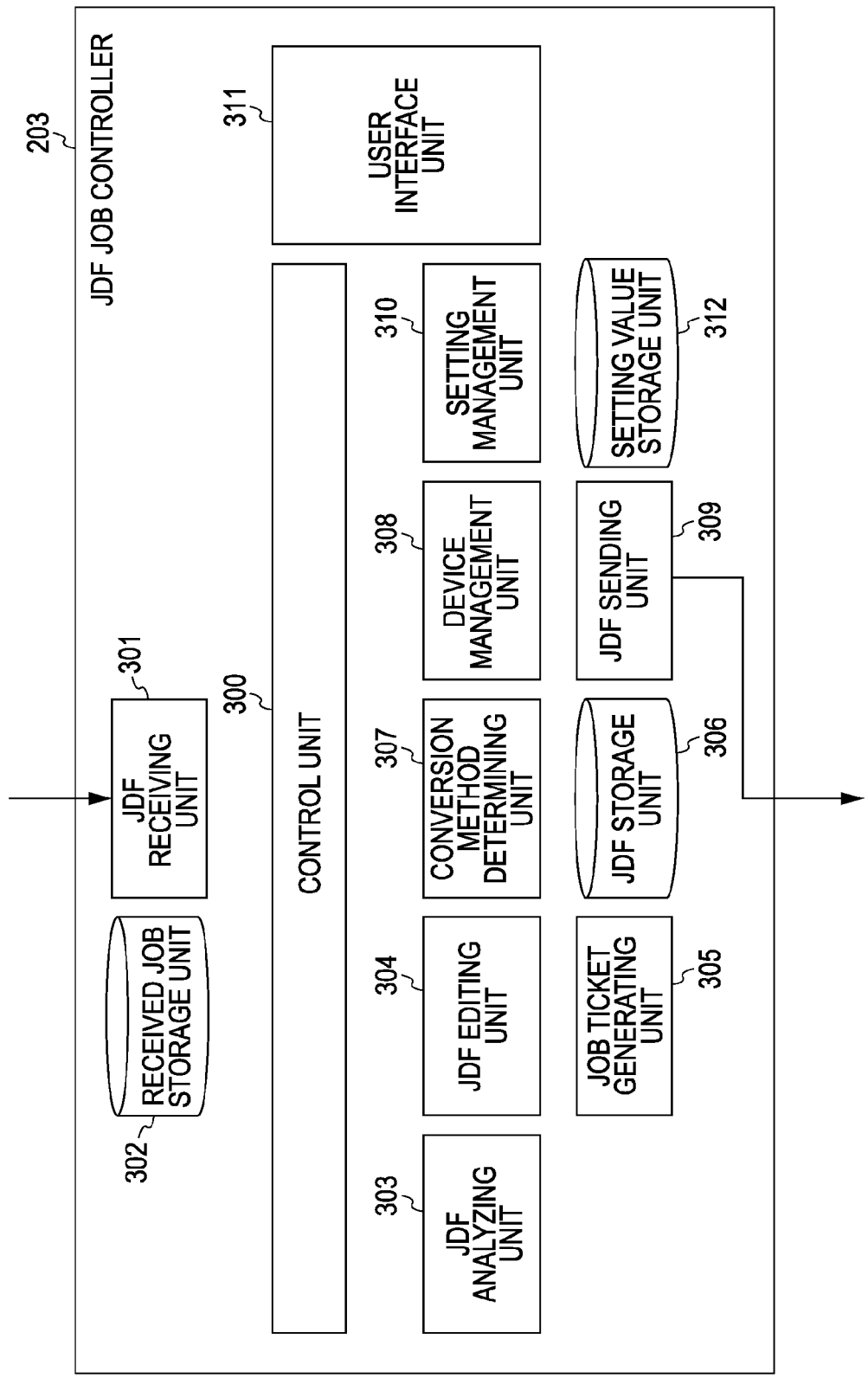
FIG. 3 is a block diagram illustrating an example of the structure of a Job Definition Format (JDF) job controller according to the embodiment of the present invention.

FIG. 3 is a block diagram illustrating an example of the structure of the JDF job controller 203.

Components 301 to 312 illustrated in FIG. 3 perform individual steps of the flowcharts described later with reference to FIGS. 9 to 13, under control of a control unit 300, which is performed using the CPU 1801.

A JDF receiving unit 301 receives a print job (JDF job 212) from the JDF job generating application 202 illustrated in FIG. 2. The received print job is stored in a received job storage unit 302.

A JDF analyzing unit 303 analyzes "JDF description details" in the received print job (JDF job 212) and recognizes print settings described in the print job. A JDF editing unit 304 edits the print job (JDF job 212) in order to send it to the MFP 103 and the nearline finisher system 104. A job ticket generating unit 305 generates a job ticket printed at the head of pages constituting the print job, at the time of editing the print job (JDF job 212) using the JDF editing unit 304. The edited print job (JDF job 212) is saved in a JDF storage unit 306.

A conversion method determining unit 307 determines which conversion method to use as a print job converting method, at the time of sending the received print job (JDF job 212) to the MFP 103 and the nearline finisher system 104.

A device management unit 308 manages the MFP 103 and the nearline finisher system 104, which are connected to a subsequent stage. A JDF sending unit 309 sends print jobs (JDF jobs 213 and 214) to the MFP 103 and the nearline finisher system 104.

A setting management unit 310 manages "operation settings of the workflow management server 102" set by the user from a user interface unit 311. Values of the operation settings are saved in a setting value storage unit 312.

Figure 4:
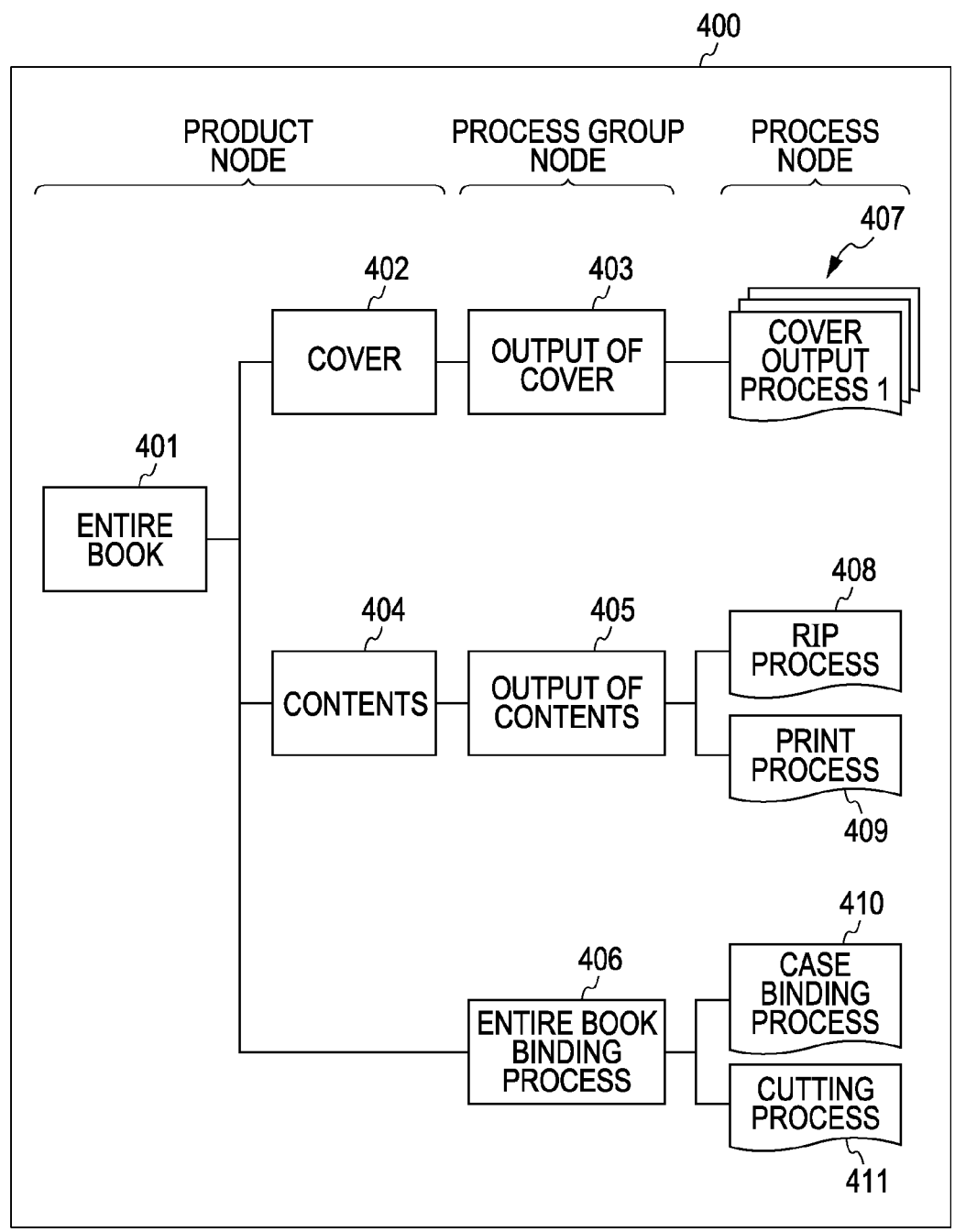
FIG. 4 is a diagram conceptually illustrating an example of a job ticket (JDF job) in the case where a case binding printing instruction is given according to the embodiment of the present invention.

FIG. 4 is a diagram conceptually illustrating an example of a job ticket (JDF job) in the case where a case binding printing instruction is given.

A job ticket 400 is described in, for example, the JDF (Extensible Markup (XML) format) and is represented using a node hierarchical structure.

Referring to FIG. 4, it is indicated that an entire book 401 which is a case-bound printed matter is fabricated by performing various steps, such as making a cover 402 and contents 404 and binding them.

In JDF, steps of fabricating a physical output matter at the time of constructing an output matter are called product nodes (the entire book 401, the cover 402, and the contents 404 in FIG. 4). Also, processing steps of forming the product nodes are called process nodes. The process nodes are intermediate elements for forming product nodes. An aggregate of several process nodes is called a process group node. As above, individual steps are distinguished in JDF.

With continued reference to FIG. 4, an aggregate of processes of generating the cover 402 is an output of cover 403, and the output of cover 403 includes a group of numerous processes 407.

As a specific example, in FIG. 4, a process group that performs an output of contents 405 includes a RIP process 408 and a print process 409. Furthermore, a process group that performs an entire bookbinding process 406 includes a case binding process 410 and a cutting process 411.

FIGS. 5A to 5D are diagrams schematically illustrating the job ticket 400 (JDF job) illustrated in FIG. 4, which is viewed from the aspect of a processing process.

Figure 5A:
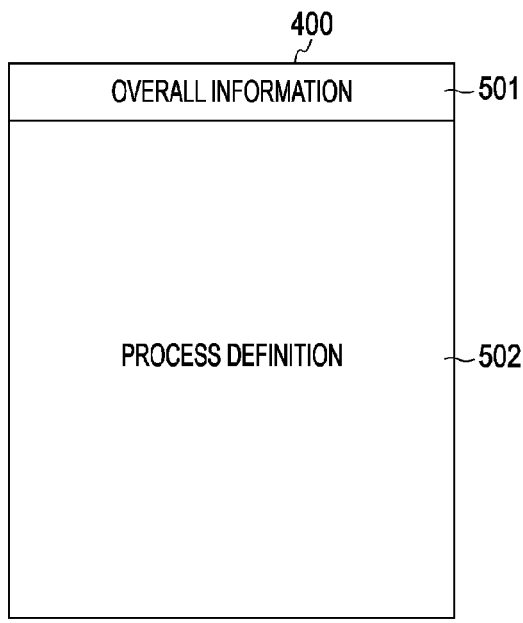
FIGS. 5A to 5D are diagrams schematically illustrating the job ticket (JDF job) viewed from the aspect of a processing process according to the embodiment of the present invention.

FIG. 5A is a diagram illustrating an example of the overall structure of the job ticket 400. In the job ticket 400, overall information of the job ticket 400 (overall information 501) and an operation process (process structure 502) are described.

Figure 5B:
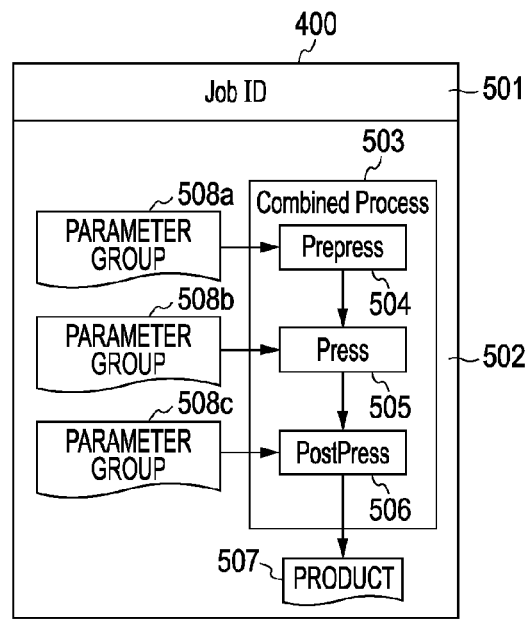

FIG. 5B is a diagram specifically illustrating the job ticket 400 illustrated in FIG. 5A. A prepressing process 504 is for giving an instruction as to how content data (print data) in PDF or the like is to be processed and arranged. Here, there are multiple prepressing processes 504.

A pressing process 505 is for giving an instruction as to how image data, which is generated in accordance with the instruction of the prepressing process 504, is to be output on a document (sheet). Here, there are multiple pressing processes 505.

A postpressing process 506 is for giving an instruction as to how a document, which is output in accordance with the instruction of the pressing process 505, is to be post-processed, such as to be case-bound. Here, there are multiple postpressing processes 506. A combined process 503 combines the prepressing processes 504, the pressing processes 505, and the postpressing processes 506 as one process. Normally, for the MFP 103 or the like which is in charge of digital printing, the bookbinding result obtained by performing a prepressing process, a pressing process, and a postpressing process on an input of one print job becomes an exclusive product (output) 507. As above, the combined process 503 is used when the user wishes to give an instruction to consecutively perform a prepressing process, a pressing process, and a postpressing process on a single input of data and to obtain an output of the exclusive product 507. The combined process 503 is always used when an instruction is given to a digital image forming device, such as an MFP, which performs at least two of a prepressing process, a pressing process, and a postpressing process.

The prepressing process 504 corresponds to, for example, the RIP process 408, which is a process node of the output of contents 405 illustrated in FIG. 4. The pressing process 505 corresponds to, for example, the print process 409, which is a process node of the output of contents 405. The postpressing process 506 corresponds to, for example, the case binding process 410 and the cutting process 411, which are process nodes of the entire bookbinding process 406.

Parameter groups 508a, 508b, and 508c that define operations are input to the process nodes 504, 505, and 506, respectively.

Figure 5C:
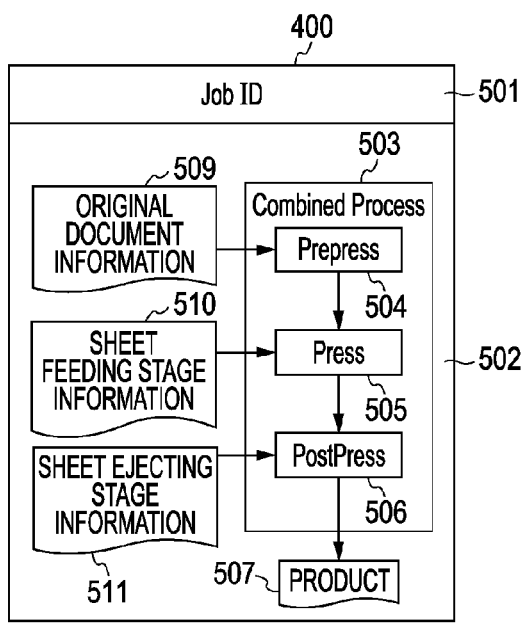

FIG. 5C is a diagram illustrating a specific example of parameters input to process nodes.

Referring to FIG. 5C, original document information 509 that indicates information on the original document to be processed is input to the prepressing process 504. Sheet feeding stage information 510 that indicates a physical sheet feeding destination is input to the pressing process 505. Sheet ejecting stage information 511 indicating a sheet ejecting destination after post-processing is input to the postpressing process 506.

Figure 5D:
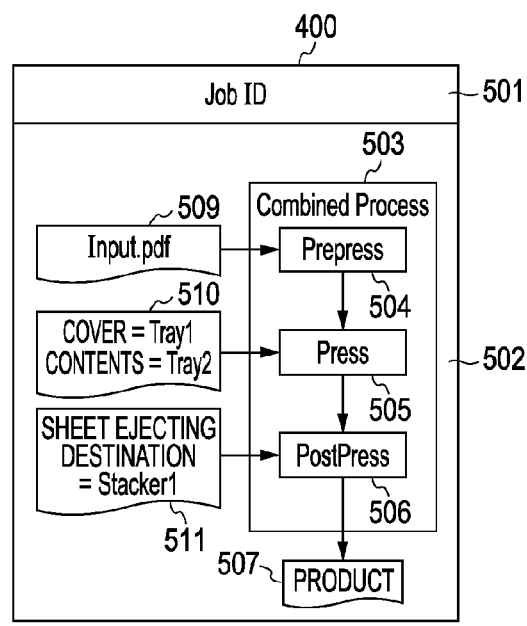

FIG. 5D is a diagram illustrating the details of the specific example of the parameters input to the process nodes.

FIG. 5D illustrates that "Input.pdf" which is information for processing PDF data is input as the original document information 509 to the prepressing process 504. FIG. 5D also illustrates that, as the feeding stage information 510 at the time of performing a pressing process, information indicating that sheets for the cover are fed from "Tray 1" and sheets for the contents are fed from "Tray 2" is input to the pressing process 505. FIG. 5D further illustrates that information indicating that sheets are ejected to "Stacker 1" after post-processing is input to the postpressing process 506.

Figure 6:
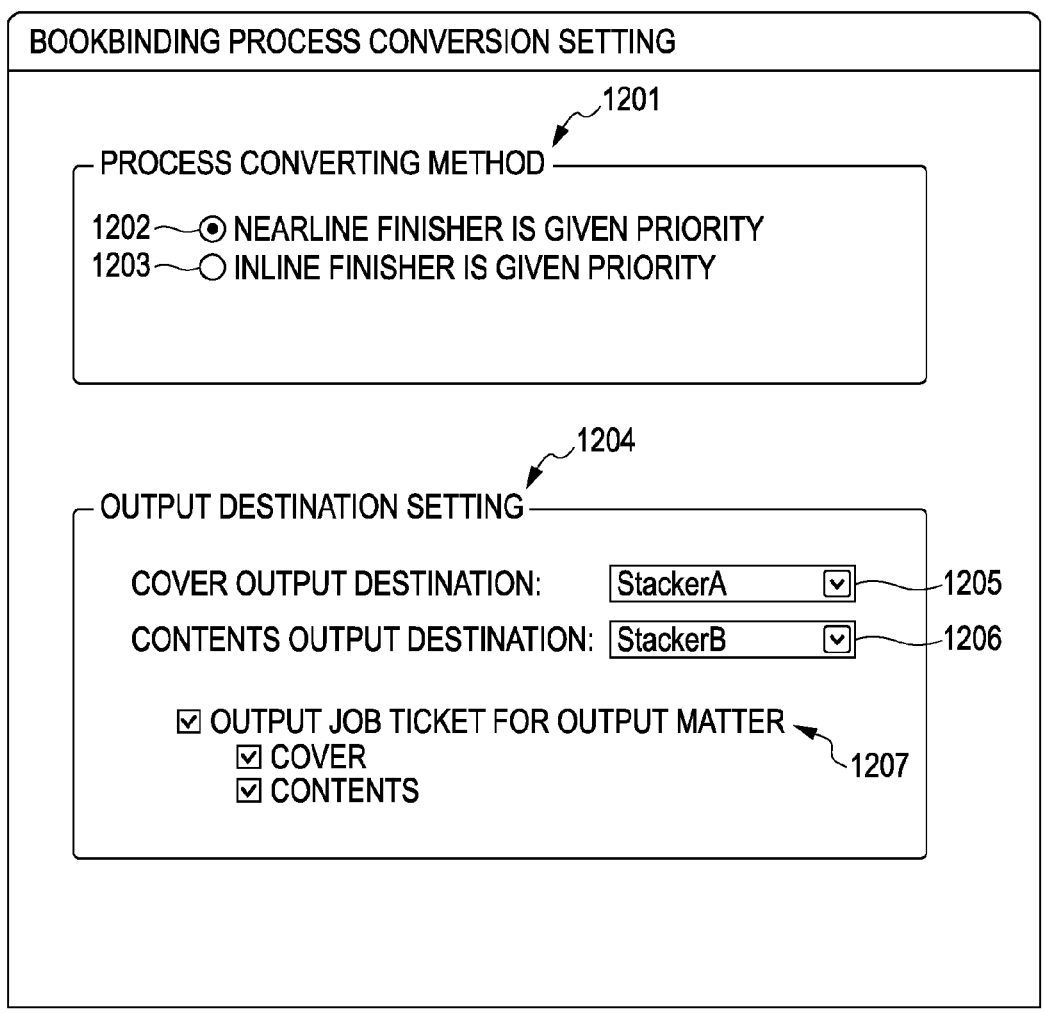
FIG. 6 is a diagram illustrating a first example of a user interface output from a user interface unit according to the embodiment of the present invention.
Figure 7:
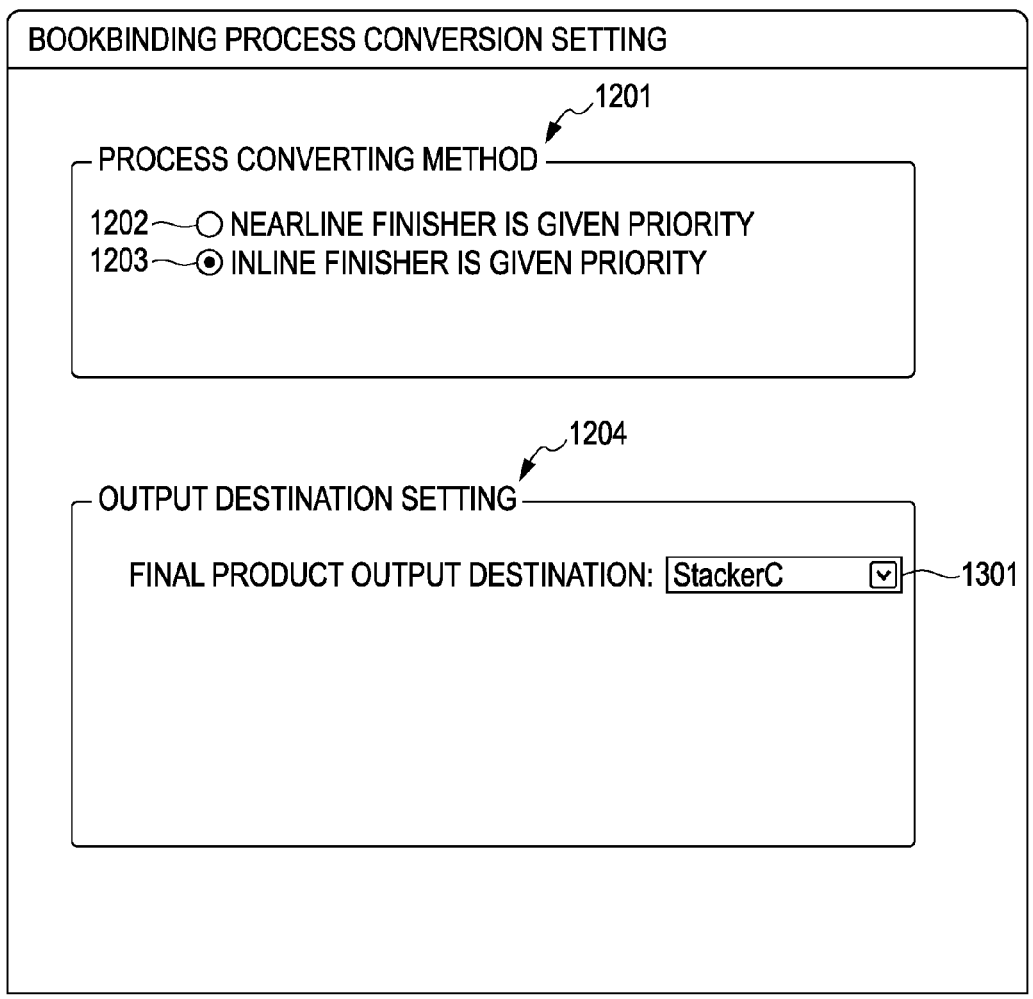
FIG. 7 is a diagram illustrating a second example of the user interface output from the user interface unit according to the embodiment of the present invention.

FIGS. 6 and 7 are diagrams illustrating examples of a user interface output from the user interface unit 311. Under management of the setting management unit 310, setting values set using the user interface unit 311 are saved in the setting value storage unit 312.

Referring to FIG. 6, a radio button 1202 indicating that "nearline finisher is given priority" is displayed in a field 1201 for setting a process converting method. When this radio button 1202 is turned ON, the nearline finisher 106 is given priority and used for the print job (JDF job 212) generated by the JDF job generating application 202.

Also, a radio button 1203 indicating that "inline finisher is given priority" is displayed in the field 1201 for setting the process converting method. When this radio button 1203 is turned ON, the inline finisher 205 is given priority and used for the JDF job 212 generated by the JDF job generating application 202.

The radio buttons 1202 and 1203 illustrated in FIGS. 6 and 7 operate in an exclusive manner.

A field 1204 for setting an output destination is a region for setting an output matter from the MFP 103.

FIG. 6 illustrates a display example of the field 1204 for setting the output destination when the radio button 1202 indicating that "nearline finisher is given priority" is turned ON in the field 1201 for setting the process converting method.

A combo-box 1205 is used to select, by the user, an output destination of the cover output from the MFP 103 at the time the nearline finisher 106 is used.

A combo-box 1206 is used to select, by the user, an output destination of the contents output from the MFP 103 at the time the nearline finisher 106 is used.

As above, in the present embodiment, the user can separately select the output destination of the cover and the output destination of the contents. Although different output destinations are generally selected as the output destinations of the cover and the contents, if the user wishes, the same output destination may be selected as the output destinations of the cover and the contents.

A check box 1207 is used to select, by the user, whether to issue (add) a job ticket for an output matter. The user can select whether or not to issue a job ticket for each of two products (cover and contents) from the MFP 103.

FIG. 7 illustrates a display example of the field 1204 for setting the output destination when the radio button 1203 indicating that "inline finisher is given priority" is turned ON.

Referring to FIG. 7, a combo-box 1301 is used to select, by the user, an output destination of an output matter output from the MFP 103 at the time the inline finisher 205 is used.

As described above, setting values set using the user interface illustrated in FIGS. 6 and 7 are stored in the setting value storage unit 312.

FIGS. 8A to 8C are diagrams illustrating examples of a table for storing setting values. FIG. 8A is a diagram illustrating the table in which setting values are not stored. FIGS. 8B and 8C are diagrams illustrating the table in which setting values are stored.

Referring to FIGS. 8A to 8C, a column 1401 stores setting items in the user interface illustrated in FIGS. 6 and 7. A column 1402 stores setting values for the setting items. These setting values in the column 1402 (hereinafter called the "setting values 1402") include a priority conversion setting 1403, a cover output destination 1404, a contents output destination 1405, a job ticket output 1406, and a final product output destination 1407.

Hereinafter, an example of a process performed with the JDF job controller 203 will be described with reference to the flowcharts illustrated in FIGS. 9 to 13 will be described.

Figure 9:
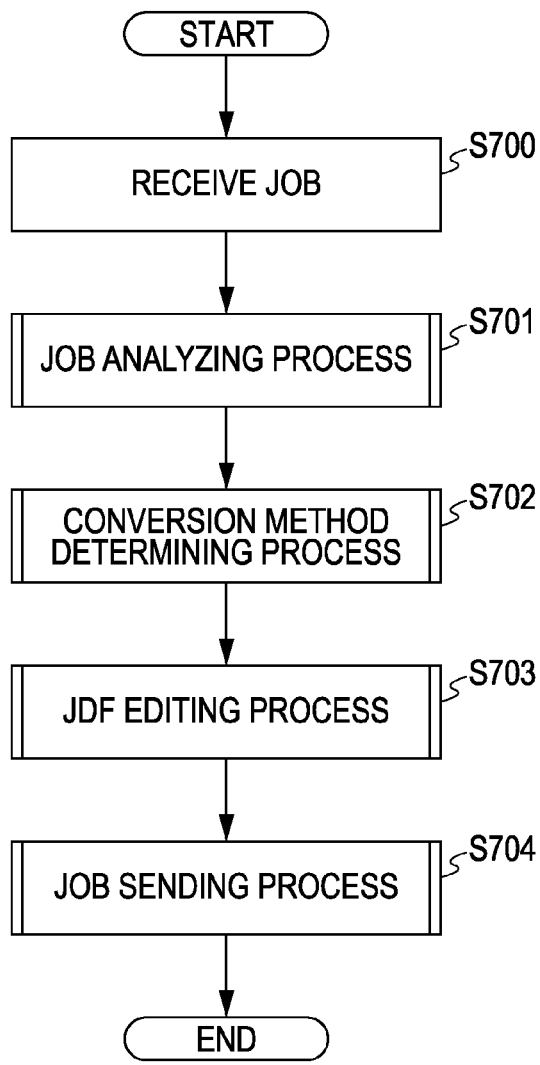
FIG. 9 is a flowchart illustrating an example of the overall outline of a process performed with the JDF job controller according to the embodiment of the present invention.

FIG. 9 is a flowchart that illustrates an example of the overall outline of a process performed with the JDF job controller 203.

Firstly, in step S700, the JDF receiving unit 301 receives a print job from the JDF job generating application 202. This print job is saved in the received job storage unit 302.

In the present embodiment, for example, an example of an obtaining unit is realized by performing the processing in step S700.

Next, in step S701, the JDF analyzing unit 303 performs a job analyzing process. The job analyzing process is a process of determining whether an attribute in the received print job indicates that the received print job is a print job generated with the intention to use the inline finisher 205 or a print job generated with the intention to use the nearline finisher 106. The details of step S701 will be described later with reference to FIG. 10.

Next, in step S702, the conversion method determining unit 307 performs a conversion method determining process. The conversion method determining process is a process of determining a JDF job converting method. The converting method converts, for example, a job that uses the inline finisher 205 to a job that uses the nearline finisher 106. The details of step S702 will be described later with reference to FIG. 11.

Next, in step S703, the JDF editing unit 304 performs a JDF editing process. The JDF editing process is a process of editing a JDF job in accordance with the conversion method determined in step S702. The details of step S703 will be described later with reference to FIG. 12.

Next, in step S704, the device management unit 308 performs a job sending process. The job sending process is a process of sending a JDF job via the JDF sending unit 309 to at least one of the MFP 103 and the nearline finisher system 104, which are under management of the JDF job controller 203.

Figure 10:
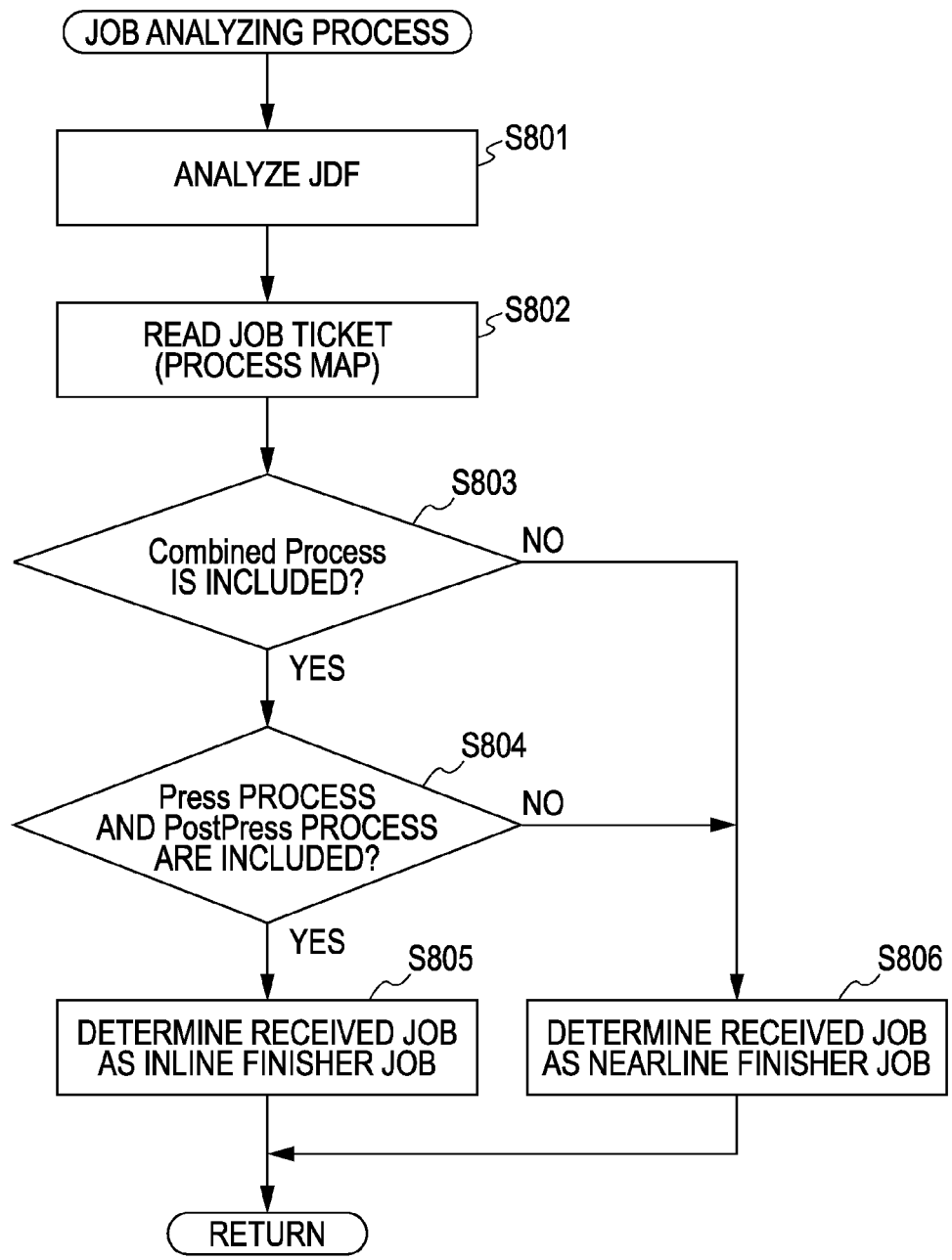
FIG. 10 is a flowchart illustrating an example of the details of a job analyzing process in step S701 according to the embodiment of the present invention.

FIG. 10 is a flowchart that illustrates an example of the details of the job analyzing process in step S701. The job analyzing process is a process of determining, with the JDF analyzing unit 303, whether the attribute in the received print job indicates that the received print job is a print job generated with the intention to use the inline finisher 205 or a print job generated with the intention to use the nearline finisher 106.

Firstly, in step S801, the JDF analyzing unit 303 analyzes "JDF description details (JDF structure)" included in the received JDF job 212.

Next, in step S802, the JDF analyzing unit 303 reads the job ticket 400 (process map) as illustrated in FIGS. 5A to 5D on the basis of the analysis result obtained in step S801.

Next, in step S803, the JDF analyzing unit 303 determines whether the foregoing combined process 503 is included in the job ticket 400. When the determination result indicates that the combined process 503 is included, the flow proceeds to step S804.

In step S804, the JDF analyzing unit 303 determines whether the combined process 503 includes the pressing process 505 and the postpressing process 506. When the determination result indicates that the pressing process 505 and the postpressing process 506 are included, the flow proceeds to step S805. In step S805, the JDF analyzing unit 303 analyzes that the received print job (JDF job) is a JDF job that uses the inline finisher 205.

In contrast, when the combined process 503 is not included in the job ticket 400 in step S803, the flow proceeds to step S806. When the pressing process 505 and the postpressing process 506 are not included in the combined process 503 in step S804, the flow proceeds to step S806.

In step S806, the JDF analyzing unit 303 analyzes that the received JDF job 212 is a JDF job that uses the nearline finisher 106.

As above, in the present embodiment, for example, an example of a first determination unit is realized by performing the processing in steps S803 and S804.

The determination method as in steps S803 and S804 is used as the method of determining the attribute in the job in this example. However, the attribute in the job may be determined by analyzing portions that are described in JDF and that are portions other than those used in steps S803 and S804.

Figure 11:
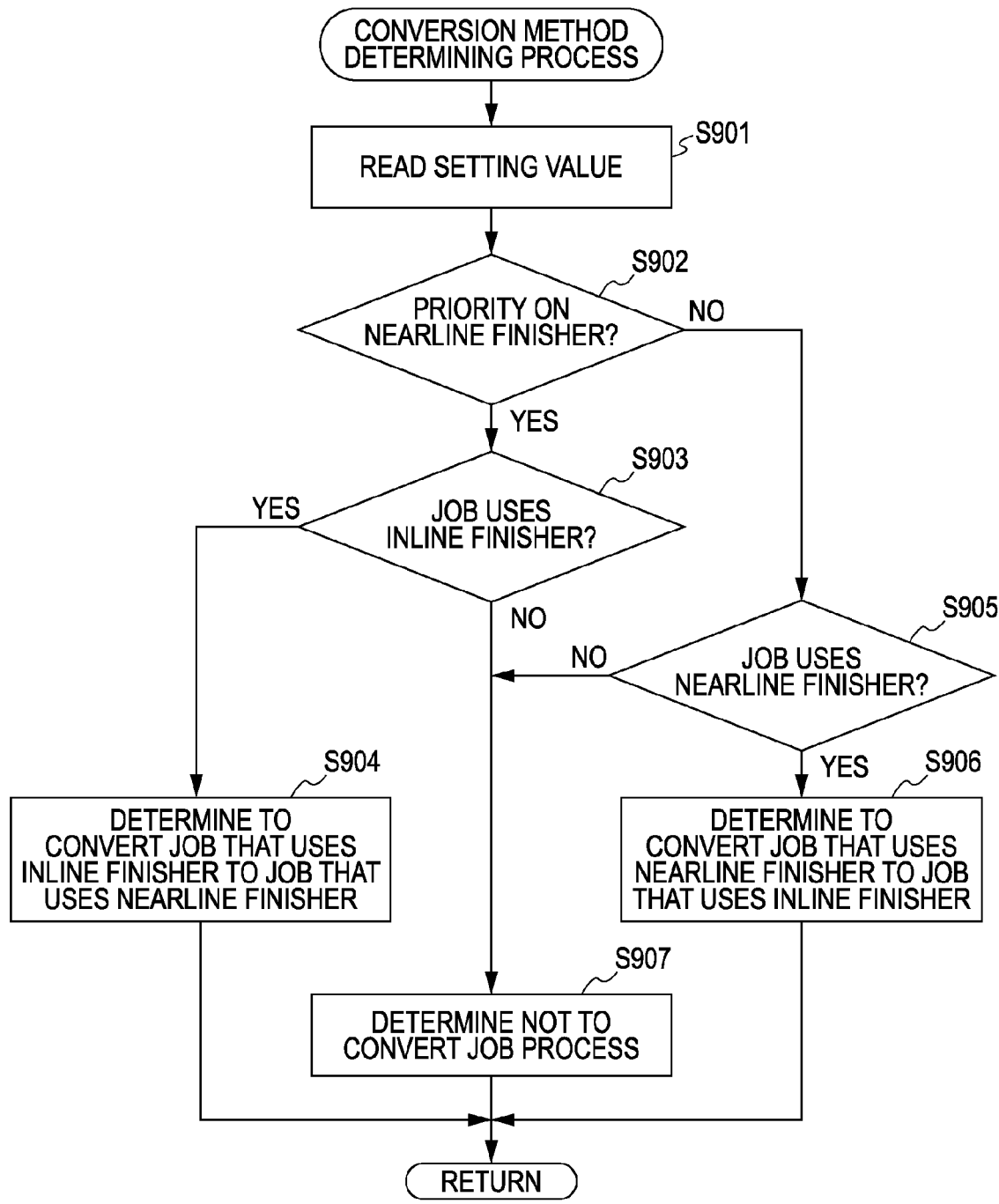
FIG. 11 is a flowchart illustrating an example of the details of a conversion method determining process in step S702 according to the embodiment of the present invention.

FIG. 11 is a flowchart that illustrates an example of the details of the conversion method determining process in step S702. As described above, the conversion method determining process is a process of determining a JDF job converting method using the conversion method determining unit 307.

Firstly, in step S901, the conversion method determining unit 307 reads, among the setting values 1402 defining the operation of this program, a value of the priority conversion setting 1403 from the setting management unit 310 (see FIGS. 8A to 8C). The setting values 1402 are set by the user beforehand.

Next, in step S902, the conversion method determining unit 307 determines whether the setting of the priority conversion setting 1403, which is read in step S901, corresponds to the setting that gives priority to the nearline finisher 106.

As above, in the present embodiment, for example, an example of a second determination unit is realized by performing the processing in step S902.

When the determination result indicates that the setting of the priority conversion setting 1403 corresponds to the setting that gives priority to the nearline finisher 106, the flow proceeds to step S903. In step S903, the conversion method determining unit 307 determines whether it is determined in step S701 by performing the process illustrated in FIG. 10 that the received JDF job 212 is a job that uses the inline finisher 205.

When the determination result indicates that the received JDF job 212 is a job that uses the inline finisher 205, the flow proceeds to step S904. In step S904, the conversion method determining unit 307 determines to convert the job, which uses the inline finisher 205, to a job that uses the nearline finisher 106.

In contrast, when it is not determined in step S903 by performing the process illustrated in FIG. 10 that the received JDF job 212 is a job that uses the inline finisher 205, the flow proceeds to step S907. In step S907, the conversion method determining unit 307 determines not to convert (the process of) the JDF job 212.

When it is determined in step S902 that the setting of the priority conversion setting 1403, which is read in step S901, corresponds to the setting that gives priority not to the nearline finisher 106, but to the inline finisher 205, the flow proceeds to step S905. In step S905, the conversion method determining unit 307 determines whether it is determined in step S701 by performing the process illustrated in FIG. 10 that the received JDF job 212 is a job that uses the nearline finisher 106.

When the determination result indicates that the received JDF job 212 is a job that uses the nearline finisher 106, the flow proceeds to step S906. In step S906, the conversion method determining unit 307 determines to convert the job, which uses the nearline finisher 106, to a job that uses the inline finisher 205.

In contrast, when it is not determined in step S905 that the received JDF job 212 is a job that uses the nearline finisher 106, the flow proceeds to step S907. In step S907, the conversion method determining unit 307 determines not to convert (the process of) the JDF job 212.

Figure 12:
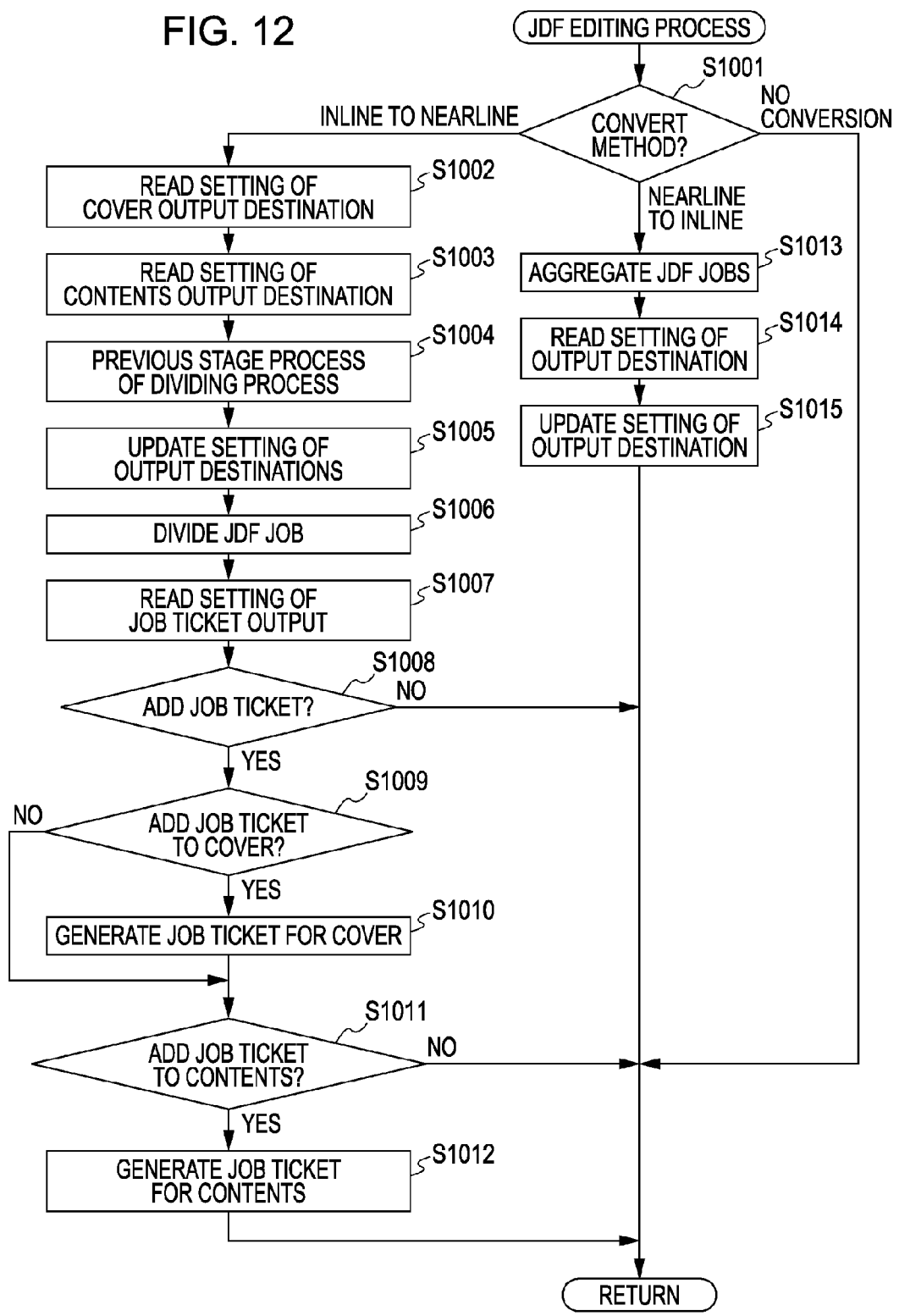
FIG. 12 is a flowchart illustrating an example of the details of a JDF editing process in step S703 according to the embodiment of the present invention.

FIG. 12 is a flowchart that illustrates an example of the details of the JDF editing process in step S703. As described above, the JDF editing process is a process of editing, with the JDF editing unit 304, a JDF job in accordance with the conversion method determined in step S702.

Firstly, in step S1001, the JDF editing unit 304 determines the conversion method determined in step S702.

When the determination result indicates that the JDF job 212 will not be converted, the process illustrated in the flowchart of FIG. 12 is terminated.

In contrast, when it is determined by performing the process illustrated in FIG. 11 that the JDF job 212 is to be converted from a job that uses the inline finisher 205 to a job that uses the nearline finisher 106, the flow proceeds to step S1002. In step S1002, the JDF editing unit 304 reads the setting of the cover output destination 1404 from the setting management unit 310.

Next, in step S1003, the JDF editing unit 304 reads the setting of the contents output destination 1405 from the setting management unit 310.

Next, in step S1004, the JDF editing unit 304 performs a previous stage process of a process of dividing a JDF job process. A specific example of this process will be described later.

Next, in step S1005, the JDF editing unit 304 sets the read details of the cover output destination 1404 and the contents output destination 1405 as output destinations of output matters from the MFP 103 in response to the JDF job.

Next, in step S1006, the JDF editing unit 304 divides the JDF job, in which the output destinations of the output matters from the MFP 103 are set, into a JDF job for the MFP 103 and a JDF job for the nearline finisher 106 in accordance with the details of the cover output destination 1404 and the contents output destination 1405. Next, in step S1007, the JDF editing unit 304 reads the setting of the job ticket output 1406.

Next, in step S1008, the JDF editing unit 304 determines whether the setting of the job ticket output 1406 is a setting for outputting a job ticket. When the determination result indicates that the setting of the job ticket output 1406 is not a setting for outputting a job ticket, the process illustrated in the flowchart of FIG. 12 is terminated.

In contrast, when the setting of the job ticket output 1406 is a setting for adding a job ticket, the flow proceeds to step S1009. Next, in step S1009, the JDF editing unit 304 determines whether the setting of the job ticket output 1406 is a setting for adding a job ticket to the cover. When the determination result indicates that the setting of the job ticket output 1406 is not a setting for adding a job ticket to the cover, the flow proceeds to step S1011 described later.

In contrast, when the setting of the job ticket output 1406 is a setting for adding a job ticket to the cover, the flow proceeds to step S1010. In step S1010, the job ticket generating unit 305 generates a cover job ticket, and the JDF editing unit 304 performs a setting to add the cover job ticket to the head of content of the cover. The flow proceeds to step S1011.

In step S1011, the JDF editing unit 304 determines whether the setting of the job ticket output 1406 is a setting for adding a job ticket to the contents. When the determination result indicates that the setting of the job ticket output 1406 is not a setting for adding a job ticket to the contents, the process illustrated in the flowchart of FIG. 12 is terminated.

In contrast, when the setting of the job ticket output 1406 is a setting for adding a job ticket to the contents, the flow proceeds to step S1012. In step S1012, the job ticket generating unit 305 generates a contents job ticket, and the JDF editing unit 304 performs a setting to add the contents job ticket to the head of content of the contents.

In contrast, when it is determined in step S1001 to convert a job that uses the nearline finisher 106 to a job that uses the inline finisher 205, the flow proceeds to step S1013. In step S1013, the JDF editing unit 304 performs a process of aggregating a process group for the nearline finisher 106 with a process group for the inline finisher 205. A specific example of this process will be described later.

Next, in step S1014, the JDF editing unit 304 reads the setting of the final product output destination 1407 from the setting management unit 310.

Next, in step S1015, the JDF editing unit 304 sets information on the final product output destination 1407, which is read in step S1014, as setting information of the JDF job output destination in which the process groups have been aggregated by the processing in step S1013.

As above, in the present embodiment, for example, an example of a setting unit is realized by performing the process of the flowchart illustrated in FIG. 12.

Figure 13:
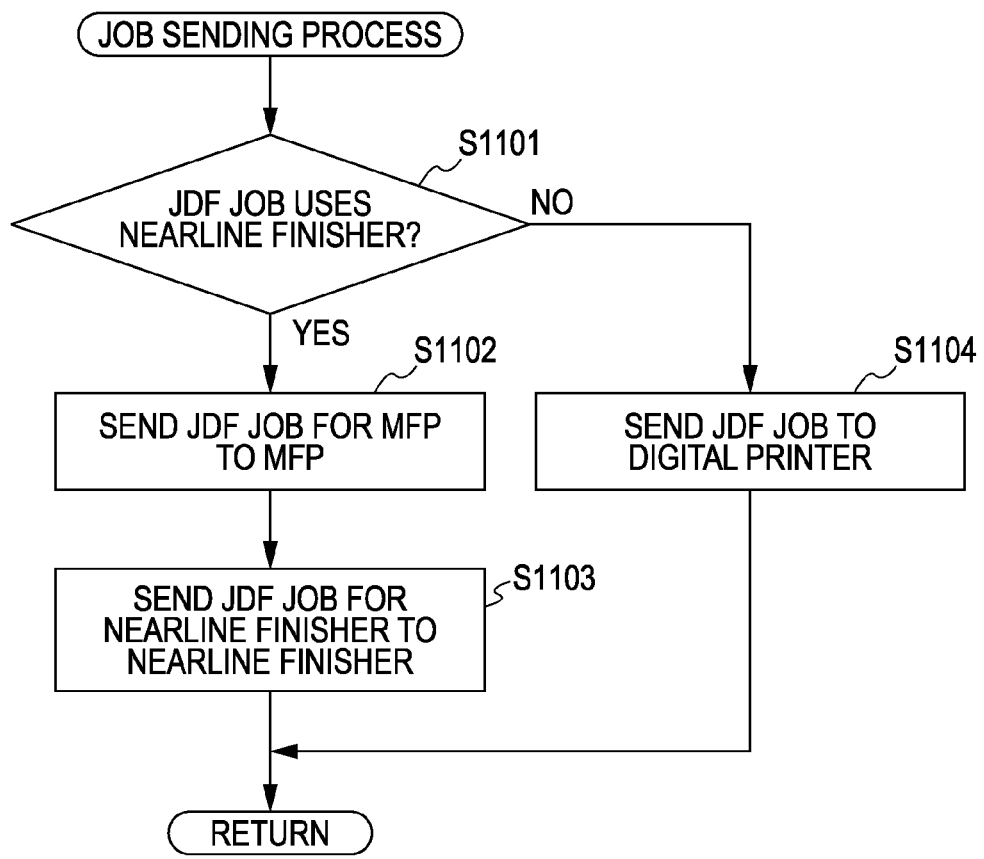
FIG. 13 is a flowchart illustrating an example of the details of a job sending process in step S704 according to the embodiment of the present invention.

FIG. 13 is a flowchart that illustrates an example of the details of the job sending process in step S704. As described above, the job sending process is a process performed by the device management unit 308 to send the JDF jobs 213 and/or 214 via the JDF sending unit 309 to at least one of the MFP 103 and the nearline finisher system 104.

Firstly, in step S1101, the device management unit 308 determines whether the JDF job 213 or 214 (job to be sent) is a job that uses the nearline finisher 106. This determination is performed using the result of determination performed in step S703.

When the determination result indicates that the JDF job 213 or 214 is a job that uses the nearline finisher 106, the flow proceeds to step S1102. In step S1102, the device management unit 308 sends, for example, among the JDF jobs obtained by division performed in step S703, the JDF job for the MFP 103 to the MFP 103 via the JDF sending unit 309.

In step S1103, the device management unit 308 sends, for example, among the JDF jobs obtained by division performed in step S703, the JDF job for the nearline finisher 106 to the nearline finisher control server 105 via the JDF sending unit 309.

When it is determined in step S1101 that the JDF job 213 or 214 is not a job that uses the nearline finisher 106, but is a job for the inline finisher 205, the flow proceeds to step S1104. In step S1104, the device management unit 308 sends, for example, the JDF job obtained by aggregation performed in step S703 to the MFP 103 via the JDF sending unit 309.

When no job conversion has been performed, the JDF job is sent in accordance with the details of the original JDF job.

First Specific Example

A first specific example of the present embodiment will now be described below.

In this example, it is assumed that the user settings as illustrated in FIG. 6 have been set as preconditions. At this time, the details of the table stored in the setting value storage unit 312 are illustrated in FIG. 8B. It is also assumed that the JDF job generating application 202 has sent the JDF job 212 (job ticket 400) for the inline finisher 205, such as that illustrated in FIG. 5B, to the JDF job controller 203.

The operation at this time will be described with reference to the flowcharts in FIGS. 9 to 13.

Firstly, in step S700 in FIG. 9, the JDF receiving unit 301 receives the JDF job 212 (job ticket 400) for the inline finisher 205, which is illustrated in FIG. 5D, from the JDF job generating application 202.

Next, in step S801 in FIG. 10, the JDF analyzing unit 303 analyzes "JDF description details (JDF structure)" included in the received JDF job 212 (job ticket 400), and reads the process structure 502 in the job ticket 400.

Here, in step S803, the JDF analyzing unit 303 determines that the read process structure 502 includes the above-described combined process 503. Furthermore, in step S804, the JDF analyzing unit 303 determines that the combined process 503 includes the pressing process 505 and the postpressing process 506. Therefore, in step S805, the JDF analyzing unit 303 determines that the received JDF job 212 is a job that uses the inline finisher 205.

Next, in step S901 in FIG. 11, the conversion method determining unit 307 reads, among the setting values 1402 defining the operation of this program, a value of the priority conversion setting 1408 from the setting management unit 310 (see FIG. 8B).

Here, in step S902, the conversion method determining unit 307 determines that the setting of the priority conversion setting 1408, which is read in step S901, corresponds to the setting that gives priority to the nearline finisher 106. Furthermore, in step S903, the conversion method determining unit 307 determines that the JDF job 212 received in step S701 (step S805) is a job that uses the inline finisher 205. Therefore, in step S904, the conversion method determining unit 307 determines to convert the job, which uses the inline finisher 205, to a job that uses the nearline finisher 106.

Next, it is determined in step S1001 in FIG. 12 that the JDF editing unit 304 determines to convert the job, which uses the inline finisher 205, to a job that uses the nearline finisher 106, and the flow proceeds to step S1002. In step S1002, the JDF editing unit 304 reads information on a cover output destination 1409. In step S1003, the JDF editing unit 304 reads information on a contents output destination 1410.

Next, in step S1004, the JDF editing unit 304 performs a previous stage process of a process of dividing the JDF job (job ticket).

FIG. 14 is a diagram conceptually illustrating an example of the procedure of a previous stage process of a process of dividing a print job (job ticket) process.

Firstly, the JDF editing unit 304 outputs the postpressing process 506, which is included in the combined process 503 in the JDF job (job ticket 400) illustrated in part (a) of FIG. 14, to the outside of the combined process 503, as illustrated in part (b) of FIG. 14.

Next, the JDF editing unit 304 adds a cover component 1602 and a contents component 1603 as output matters (products) from the pressing process 505, as illustrated in part (c) of FIG. 14.

Next, the JDF editing unit 304 adds setting information 1604, such as a case binding setting, to the process of the postpressing process 506, as illustrated in part (d) of FIG. 14. Here, a process borderline 1606 indicates the border between a job performed with the MFP 103 and a job performed with the nearline finisher system 104. That is, it is set in the JDF job that the cover component 603 and the contents component 604 output from the MFP 103 are to be input to the postpressing process 506 in the nearline finisher system 104.

Next, in step S1005, the JDF editing unit 304 updates the output destinations of the output matters from the MFP 103 to the read details of the cover output destination 1409 and the contents output destination 1410. Here, the setting parameters of the pressing process 505 are updated on the basis of the information on the cover output destination 1409 and the information on the contents output destination 1410. Specifically, as illustrated in part (e) of FIG. 14, it is indicated that the setting parameters of the pressing process 505 are updated to output destination information 1605 which indicates that the cover output destination is "Stacker A" and the contents output destination is "Stacker B".

Next, in step S1006, the JDF editing unit 304 divides the JDF job (job ticket), in which the output destinations are updated to the details of the settings of the cover output destination 1404 and the contents output destination 1405, into a job to be sent to the MFP 103 and a job to be sent to the nearline finisher 106.

Figure 15A:
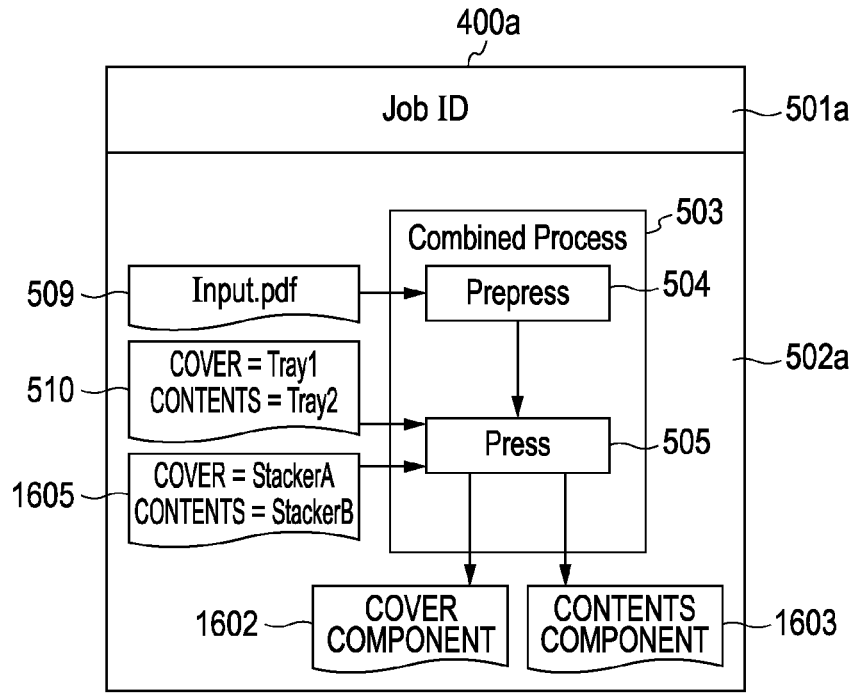
FIG. 15A is a diagram illustrating an example of a JDF job (job ticket) sent to a digital multifunctional device according to the embodiment of the present invention.
Figure 15B:
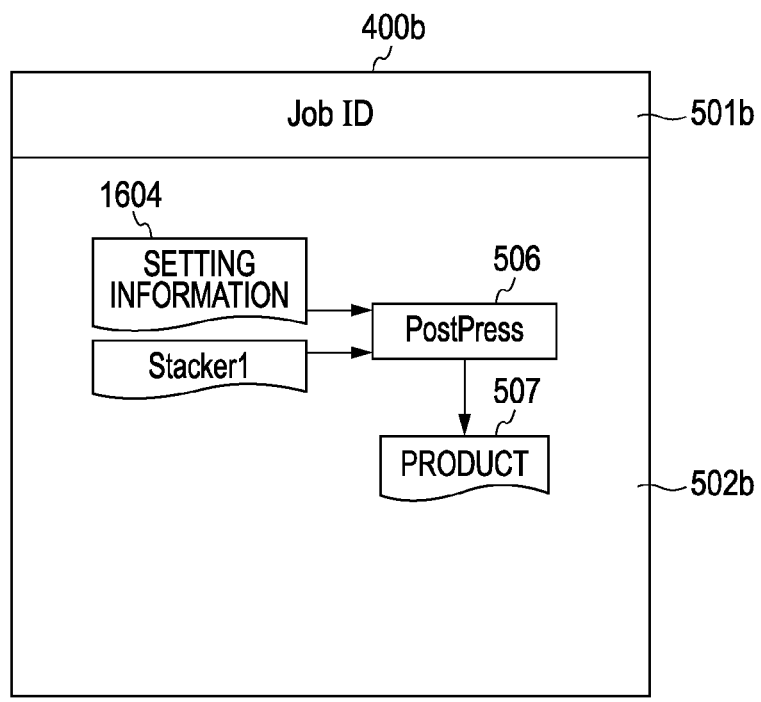
FIG. 15B is a diagram illustrating an example of a JDF job (job ticket) sent to a nearline finisher according to the embodiment of the present invention.

FIG. 15A is a diagram illustrating an example of a JDF job (job ticket 400*a*) sent to the MFP 103, and FIG. 15B is a diagram illustrating an example of a JDF job (job ticket 400*b*) sent to the nearline finisher 106.

Next, in step S1008, the JDF editing unit 304 determines that the setting of the job ticket output 1411 is a setting for adding a job ticket. Furthermore, in step S1009, the JDF editing unit 304 determines that the setting of the job ticket output 1411 is a setting for adding a job ticket to the cover. In step S1010, the job ticket generating unit 305 generates a cover job ticket, and the JDF editing unit 304 performs a setting to add the cover job ticket to the head of content of the cover.

Next, in step S1011, the JDF editing unit 304 determines that the setting of the job ticket output 1411 is a setting for adding a job ticket to the contents. In step S1012, the job ticket generating unit 305 generates a contents job ticket, and the JDF editing unit 304 performs a setting to add the generated contents job ticket to the head of content of the contents.

Figure 16A:
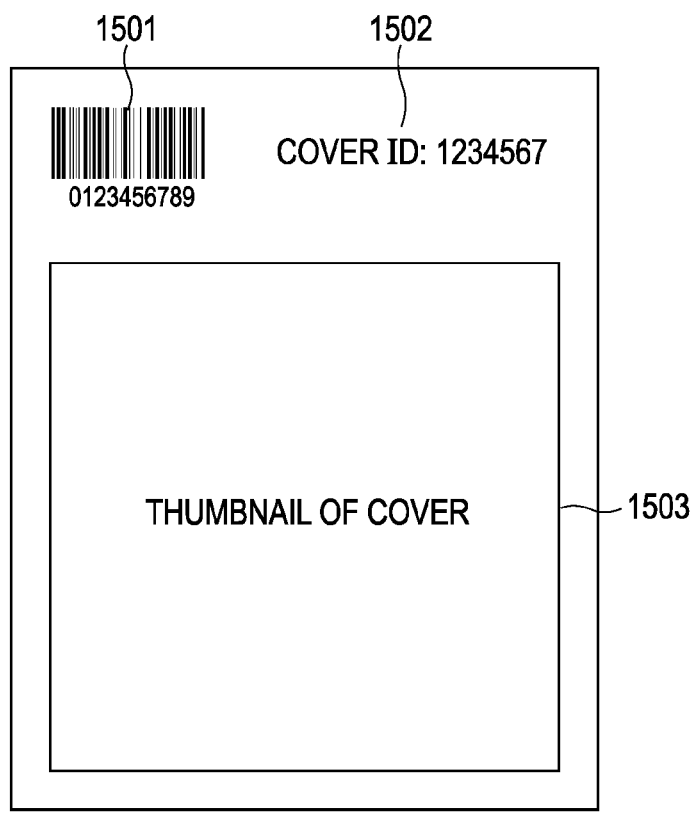
FIG. 16A is a diagram illustrating an example of a job ticket for the cover according to the embodiment of the present invention.
Figure 16B:
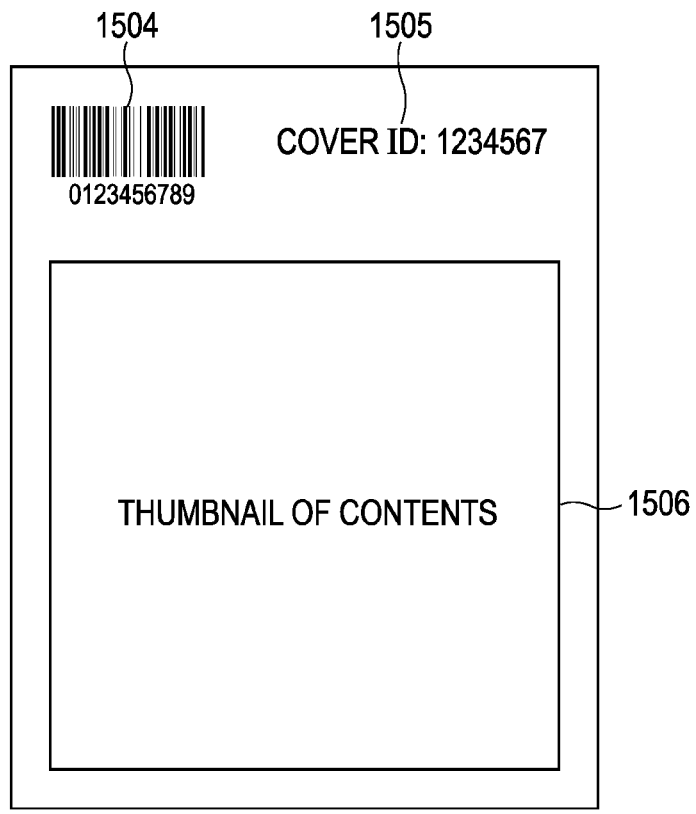
FIG. 16B is a diagram illustrating an example of a job ticket for the contents according to the embodiment of the present invention.

FIGS. 16A and 16B are diagrams illustrating an example of the cover job ticket and an example of the contents job ticket, which are generated by the MFP 103.

FIG. 16A is a diagram illustrating an example of a cover job ticket printed on the top face of an output matter of the cover. FIG. 16B is a diagram illustrating an example of a contents job ticket printed on the top face of an output matter of the contents. For example, a sheet on which a display job ticket such as that illustrated in FIG. 16A is printed is output, and then the cover is printed. A sheet on which a contents job ticket such as that illustrated in FIG. 16B is printed is output, and then the contents are printed.

In FIGS. 16A and 16B, the case where job IDs 1501 and 1504 are indicated using barcodes is illustrated by way of example.

Together with the job ID 1501, a cover ID 1502 for identifying the cover and a thumbnail image 1503 of the head page of the cover are printed as the display job ticket on the top face of the output matter of the cover. In contrast, a cover ID 1505 printed as the contents job ticket on the top face of the output matter of the contents is the ID of the cover corresponding to the cover of the contents, and is the same ID as the cover ID 1502 printed on the top face of the output matter of the cover. Together with the cover ID 1505 and a job ID 1504, a thumbnail image 1506 of the head page of the contents is printed as the contents job ticket on the top face of the output matter of the contents.

Referring now to FIG. 13, in step S1101, the device management unit 308 determines that the JDF job to be sent is a job that uses the nearline finisher 106. This is because the processing in steps S1002 to S1012 in FIG. 12 was performed, and the job for the inline finisher 205 was converted to the job for the nearline finisher 106.

Next, in step S1102, the device management unit 308 sends the JDF job for the MFP 103 (JDF job (job ticket) illustrated in FIG. 15A) to the MFP 103 via the JDF sending unit 309.

Next, in step S1103, the device management unit 308 sends the JDF job for the nearline finisher 106 (JDF job (job ticket) illustrated in FIG. 15B) to the nearline finisher control server 105 via the JDF sending unit 309.

Second Specific Example

A second specific example of the present embodiment will now be described below.

In the first specific example, the process of changing a job intended to use the inline finisher 205 to a job intended to use the nearline finisher 106 has been described. In contrast, in this specific example, a process of changing a job intended to use the nearline finisher 106 to a job intended to use the inline finisher 205 will be described.

In this example, it is assumed that the user settings as illustrated in FIG. 7 have been set as preconditions. At this time, the details of the table stored in the setting value storage unit 312 are illustrated in FIG. 8C. It is also assumed that the JDF job generating application 202 has sent the JDF job 212 (job ticket 400) for the nearline finisher 106, such as that illustrated in part (a) of FIG. 17, to the JDF job controller 203. In the description of this example, detailed descriptions of portions that have been described in the first specific example will be omitted by using the same reference numerals as those illustrated in FIG. 14 and the like.

The operation at this time will be described with reference to the flowcharts in FIGS. 9 to 13.

Figure 17:
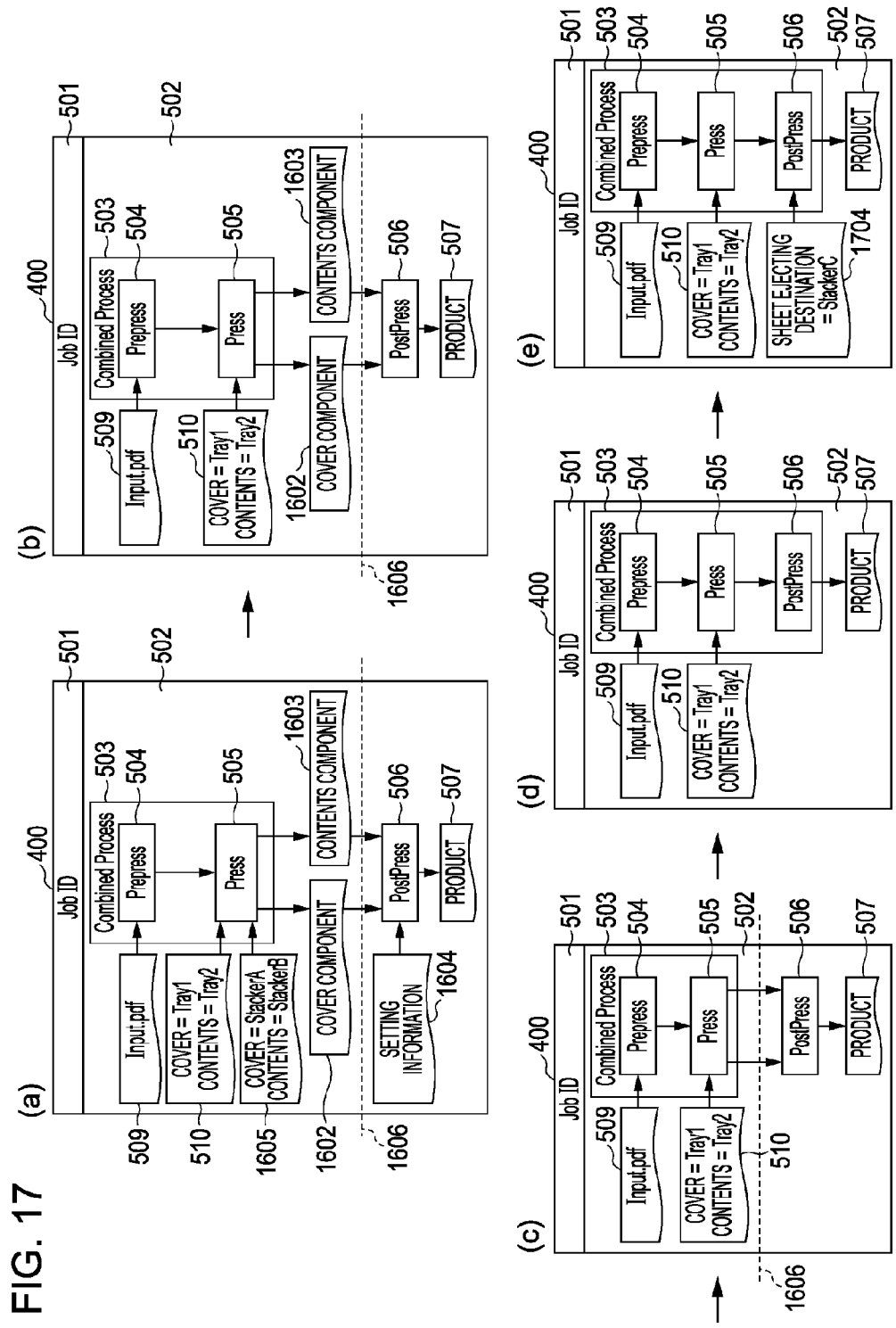
FIG. 17 is a diagram conceptually illustrating the procedure of a process of aggregating a process group for the nearline finisher with a process group for an inline finisher.

Firstly, in step S700 in FIG. 9, the JDF receiving unit 301 receives the JDF job 212 (job ticket 400) for the nearline finisher 106, which is illustrated in part (a) of FIG. 17, from the JDF job generating application 202.

Next, in step S801 in FIG. 10, the JDF analyzing unit 303 analyzes "JDF description details (JDF structure)" included in the received JDF job 212 (job ticket 400), and reads the process structure 502 in the job ticket 400.

Here, in step S803, the JDF analyzing unit 303 determines that the read process structure 502 includes the above-described combined process 503. Furthermore, in step S804, the JDF analyzing unit 303 determines that the combined process 503 includes only the pressing process 505, and does not include both the pressing process 505 and the postpressing process 506. Therefore, in step S806, the JDF analyzing unit 303 determines that the received JDF job 212 is a job that uses the nearline finisher 106.

Next, in step S901 in FIG. 11, the conversion method determining unit 307 reads, among the setting values 1402 defining the operation of this program, a value of the priority conversion setting 1412 from the setting management unit 310 (see FIG. 8C).

Next, in step S902, the conversion method determining unit 307 determines that the setting of the priority conversion setting 1408, which is read in step S901, corresponds to the setting that gives priority to the inline finisher 205.

Here, in step S905, the conversion method determining unit 307 determines that the JDF job 212 received in step S701 (step S806) is a job that uses the nearline finisher 106. Therefore, in step S906, the conversion method determining unit 307 determines to convert the job, which uses the nearline finisher 106, to a job that uses the inline finisher 205.

Next, it is determined in step S1001 in FIG. 12 that the JDF editing unit 304 determines to convert the job, which uses the nearline finisher 106, to a job that uses the inline finisher 205, and the flow proceeds to step S1013. The JDF editing unit 304 performs a process of aggregating a process group for the nearline finisher 106 with a process group for the inline finisher 205.

FIG. 17 is a diagram conceptually illustrating the procedure of a process of aggregating a process group for the nearline finisher 106 with a process group for the inline finisher 205.

Firstly, the JDF editing unit 304 deletes the sheet ejecting destination information 1605 and the like, which are set in the pressing process 505 of the JDF job (job ticket 400) for the nearline finisher 106, which is illustrated in part (a) of FIG. 17.

Next, the JDF editing unit 304 deletes the cover component 1602 and the contents component 1603, which are intermediate output components, as illustrated in part (c) of FIG. 17.

Next, the JDF editing unit 304 aggregates the postpressing process 506 with the combined process 503 (see part (d) of FIG. 17).

Referring back to FIG. 12, in step S1014, the JDF editing unit 304 reads the setting of a final product output destination 1413 from the setting management unit 310 (see FIG. 8C).

Next, in step S1015, the JDF editing unit 304 updates the setting information of the JDF job (job ticket) output destination, which is obtained by aggregation performed in the processing in step S1013, to information of the final product output destination 1413, which is read in step S1014. In the example illustrated in part (e) of FIG. 17, output destination setting information 1704 is set as an input parameter for the postpressing process 506.

Here, the job for the nearline finisher 106 is converted to the job for the inline finisher 205. Therefore, in step S1101 in FIG. 13, the device management unit 308 determines that the JDF job to be sent is a job that uses the inline finisher 205.

Next, in step S1104, the device management unit 308 sends the JDF job obtained in step S1015 (JDF job (job ticket) illustrated in part (e) of FIG. 17) to the MFP 103 via the JDF sending unit 309.

As above, in the present embodiment, at the time of processing a print job that uses the inline finisher 205, when it is determined that the user has set to use the nearline finisher 106 with priority, this job is converted to a job for the nearline finisher 106. That is, the job, which uses the inline finisher 205, is divided into a print job (process) that is executed using the inline finisher 205 and a print job (process) that is executed using the nearline finisher 106. On this occasion, the information on the output matters from the inline finisher 205 (the cover component 1602 and the contents component 1603) and the sheet ejecting destination information 1605 in the inline finisher 205 are set in a print job (process) to be executed with the inline finisher 205. Also, the setting indicating that the information on the output matters from the inline finisher 205 (the cover component 1602 and the contents component 1603) is to be post-processed is set in a print job (process) to be executed with the nearline finisher 106.

Therefore, when a job generated with the intention to be subjected to post-processing using the inline finisher 205 is to be post-processed using the nearline finisher 106, the MFP 103 can correctly and separately output sheets of the cover and the contents. Therefore, it can be made easier for the user to perform the operation processing using the nearline finisher 106. Also, even when a job generated with the intention to be subjected to post-processing using the inline finisher 205 is input, post-processing can be easily performed using the nearline finisher 106.

In the present embodiment, when a job generated with the intention to be subjected to post-processing using the inline finisher 205 is to be post-processed using the nearline finisher 106, physical job tickets that correlate the cover and the contents are added to the cover and the contents. Specifically, the job ID 1501, the cover ID 1502 for identifying the cover, and the thumbnail image 1503 of the head page of the cover are printed as the display job ticket on the top face of the output matter of the cover. Also, the job ID 1504, the cover ID 1505 which is the same ID as the cover ID 1502, and the thumbnail image 1506 of the head page of the contents are printed as the contents job ticket on the top face of the output matter of the contents. Therefore, the user can easily recognize the correlated cover and contents.

At the same time, at the time of processing a print job that uses the nearline finisher 106, when it is determined that the user has set to use the inline finisher 205 with priority, this job is converted to a job for the inline finisher 205. Therefore, a process to be executed using the inline finisher 205 and a process to be executed using the nearline finisher 106 are aggregated, and the print job is converted to a job for the inline finisher 205. Specifically, the sheet ejecting destination information 1605 in the inline finisher 205, and the output matter information (the cover component 1602 and the contents component 1603) in the inline finisher 205 are deleted from the print job. Also, the sheet ejecting destination information 1704 in the nearline finisher 106 is set in the print job. The setting to perform post-processing of the printed cover and contents as a whole using the inline finisher 205 is set in the print job.

Therefore, a job generated with the intention to be subjected to post-processing using the nearline finisher 106 can be aggregated, and an output from the MFP 103 can be obtained as an exclusive product. Therefore, even when a job generated with the intention to be subjected to post-processing using the nearline finisher 106 is input, post-processing can be easily performed using the inline finisher 205.

As above, in the present embodiment, the inline finisher 205 and the nearline finisher 106 can be adaptively used in accordance with the user's intention.

In the present embodiment, the cover job ticket and the contents job ticket are separately generated. However, only one of the cover job ticket and the contents job ticket may be generated when the cover and the contents can be correlated. For example, when the thumbnail image of the first page of the contents is printed on the basis of the cover job ticket, the contents job ticket need not be generated.

Post-processing is not limited to case binding. When case binding is performed, the MFP 103 outputs the printed matter of the cover and contents in a separate manner, and the printed matter is subjected to post-processing using the nearline finisher 106 (case binding machine). However, when bookbinding is to be performed with a different method, the MFP 103 separately outputs the printed matter in accordance with the post-processing (bookbinding) method. That is, the MFP 103 can output the printed matter in multiple portions (one portion and the other portion) in accordance with the post-processing (bookbinding) method.

According to the present invention, a post-processing device included in a printing device and a post-processing device not included in the printing device can be adaptively used in accordance with settings entered by a user.

Individual means constituting a print job management device and individual steps of a print job management method according to the foregoing embodiment of the present invention can be achieved by running a program stored in a RAM on a ROM in a computer. The program and a computer-readable recording medium having the program recorded thereon are within the scope of the present invention.

The present invention can be implemented in various forms, such as a system, a device, a method, a program, or a computer-readable storage medium. More specifically, for example, the present invention can be applied to a system constituted by a plurality of devices, or to a device constituted by a single device.

A program of software that realizes the functions of the embodiment described above (a program corresponding to the flowcharts illustrated in FIGS. 9 to 13) and supplied to a system or a device directly or remotely is within the scope of the present invention. Also, the supplied program may be read and executed using a computer of the system or the device. This also falls within the scope of the present invention.

Therefore, program code installed on a computer to achieve the processing functions according to the present invention is within the scope of the present invention. That is, a computer program for achieving the processing functions according to the present invention falls within the scope of the present invention.

In that case, the program may be object code, a program executed by an interpreter, script data supplied to an OS, or the like, as long as it functions as a program.

A recording medium for supplying the program may be, for example, a floppy disk, a hard disk, an optical disk, a magneto-optical (MO) disk, a compact-disc read-only memory (CD-ROM), a compact-disc recordable (CD-R), or a compact-disc rewritable (CD-RW). Also, a recording medium for supplying the program may be a magnetic tape, a non-volatile memory card, a ROM, a digital versatile disc (DVD), a DVD-ROM, or a DVD-R.

Alternatively, the program may be supplied to a client computer in the following manner. That is, using a browser, the client computer connects to a Web page on the Internet. The computer program of the present invention itself or a compressed file including an automatic installing function is downloaded from the Web page to a computer-readable storage medium, such as a hard disk.

Furthermore, program code of the program according to the present invention may be divided into a plurality of files and provided in different Web pages so that the individual files can be downloaded from the Web pages. That is, a World Wide Web (WWW) server that allows a plurality of users to download program files for implementing processing functions according to the present invention using a computer also falls within the scope of the present invention.

Furthermore, the program according to the present invention may be encrypted when the program is stored on a computer-readable storage medium, such as a CD-ROM, and a user who satisfies a predetermined condition is allowed to download key information for decrypting the encrypted program from a Web page via the Internet. By using the downloaded key information, the user can execute the encrypted program and install the program on a computer.

Furthermore, the functions according to the foregoing embodiment are achieved by executing the read program using a computer. In addition, the functions according to the foregoing embodiment are achieved by causing an OS or the like, which is running on a computer, to perform all or part of the actual processing.

Furthermore, the program read from the computer-readable storage medium may be written to a memory of a function expansion board mounted on the computer or a function expansion unit connected to the computer. Thereafter, a CPU or the like of the function expansion board or the function expansion unit executes all or part of the actual processing on the basis of instructions of the program, whereby the functions according to the foregoing embodiment are achieved.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-122306 filed May 8, 2008, which is hereby incorporated by reference herein in its entirety.

What is claimed is:

1. A device capable of communicating with a printing device and a nearline finisher, the nearline finisher not being connected to the printing device via a sheet conveying path, the device comprising:
 a selecting unit configured to select whether to use the nearline finisher or not; and
 a display control unit configured to display an item capable of accepting a sheet ejecting destination for a cover, an item capable of accepting a sheet ejecting destination for contents and an item capable of accepting a selection to print a job ticket when the selecting unit selects to use the nearline finisher, and to display an item capable of accepting a sheet ejection destination without displaying the item capable of accepting the sheet ejection destination for the cover and the item capable of accepting a selection to print a job ticket when the selecting unit selects not to use the nearline finisher.

2. The device according to claim 1, further comprising:
a sending unit configured to send a job for a printing process to the printing device and to send a job for a post-processing to the post-processing device nearline finisher when the selecting unit selects to use the post-processing device nearline finisher.

3. The device according to claim 1, further comprising:
a printing control unit configured to print a cover job ticket on which an image of the cover is printed for a printed material for the cover and to print a contents job ticket on which an image of the contents is printed for a printed material for the contents.

4. A method capable of communicating with a printing device and a post-processing device nearline finisher, the post-processing device nearline finisher not being connected to the printing device via a sheet conveying path, the method comprising:
selecting whether to use the post-processing device nearline finisher or not; and
displaying, by a display control unit, an item capable of accepting a sheet ejecting destination for a cover, an item capable of accepting a sheet ejecting destination for contents and an item capable of accepting a selection to print a job ticket when the selecting step selects to use the post-processing device nearline finisher, and displaying an item capable of accepting a sheet ejection destination without displaying the item capable of accepting the sheet ejection destination for the cover and the item capable of accepting a selection to print a job ticket when the selecting step selects not to use the post-processing device nearline finisher.

5. The method according to claim 4, further comprising:
sending a job for a printing process to the printing device and sending a job for a post-processing to the post-processing device nearline finisher when it is selected in the selecting step to use the post-processing device nearline finisher.

6. The method according to claim 4, further comprising:
printing a cover job ticket on which an image of the cover is printed for a printed material for the cover and printing a contents job ticket on which an image of the contents is printed for a printed material for the contents.

7. A non-transitory computer-readable storage medium storing a program to be executed in a device capable of communicating with a printing device and a post-processing device nearline finisher, the post-processing device nearline finisher not being connected to the printing device via a sheet conveying path, the program causing the device to perform:
selecting whether to use the post-processing device nearline finisher or not; and
displaying, by a display control unit, an item capable of accepting a sheet ejecting destination for a cover, an item capable of accepting a sheet ejecting destination for contents and an item capable of accepting a selection to print a job ticket when the selecting step selects to use the post-processing device nearline finisher, and displaying an item capable of accepting a sheet ejection destination without displaying the item capable of accepting the sheet ejection destination for the cover and the item capable of accepting a selection to print a job ticket when the selecting step selects not to use the post-processing device nearline finisher.

8. The non-transitory computer-readable storage medium according to claim 7, further comprising:
sending a job for a printing process to the printing device and sending a job for a post-processing to the post-processing device nearline finisher when it is selected in the selecting step to use the post-processing device nearline finisher.

9. The non-transitory computer-readable storage medium according to claim 7, further comprising:
printing a cover job ticket on which an image of the cover is printed for a printed material for the cover and printing a contents job ticket on which an image of the contents is printed for a printed material for the contents.

10. The device according to claim 1, wherein an image of a particular page and a job ID are printed on a printed material for the job ticket when printing the job ticket is designated.

11. The method according to claim 4, further wherein an image of a particular page and a job ID are printed on a printed material for the job ticket when printing the job ticket is designated.

12. The non-transitory computer-readable storage medium according to claim 7, wherein an image of a particular page and a job ID are printed on a printed material for the job ticket when printing the job ticket is designated.

* * * * *